(12) United States Patent
Dizdarevic et al.

(10) Patent No.: US 7,793,884 B2
(45) Date of Patent: Sep. 14, 2010

(54) DELTOID MAIN WING AERODYNAMIC CONFIGURATIONS

(76) Inventors: Faruk Dizdarevic, 3300 W. Lincoln Ave., #129, Anaheim, CA (US) 92801;
Mithad Dizdarevic, 3300 W. Lincoln Ave., #129, Anaheim, CA (US) 92801

( * ) Notice: Subject to any disclaimer, the term of this patent is extended or adjusted under 35 U.S.C. 154(b) by 0 days.

(21) Appl. No.: 12/347,997

(22) Filed: Dec. 31, 2008

(65) Prior Publication Data

US 2010/0163670 A1    Jul. 1, 2010

(51) Int. Cl.
  B64C 3/00    (2006.01)
(52) U.S. Cl. ............... 244/36; 244/117 R; 244/198
(58) Field of Classification Search ............ 244/12.1, 244/13, 36, 117 R, 119, 54, 199.1, 198, 35 R, 244/91; D12/331, 333, 337
See application file for complete search history.

(56) References Cited

U.S. PATENT DOCUMENTS

| | | | |
|---|---|---|---|
| 1,893,129 | A | 1/1933 | Charpentier |
| 2,123,096 | A | 7/1938 | Charpentier |
| 2,294,367 | A | 9/1942 | Flamming |
| 2,402,358 | A | 6/1946 | Bauman |
| 2,406,506 | A | 8/1946 | Northrop |
| 2,412,646 | A | 12/1946 | Northrop |
| 2,557,962 | A | 6/1951 | Greene |
| 2,616,639 | A | 11/1952 | Burnell |
| 2,650,780 | A | 9/1953 | Northrop |
| 2,734,701 | A | 2/1956 | Horton |
| 3,216,673 | A | 11/1965 | Alter et al. |
| 3,576,300 | A | 4/1971 | Palfreyman |
| 3,608,850 | A | 9/1971 | Fredericks |
| 3,625,459 | A | 12/1971 | Brown |
| 3,630,471 | A | 12/1971 | Fredericks |
| 3,761,041 | A | 9/1973 | Putnam |
| 3,869,102 | A | 3/1975 | Carroll |

(Continued)

FOREIGN PATENT DOCUMENTS

UA    13409    3/2006

(Continued)

OTHER PUBLICATIONS

"Model 1" French Journal: Gazzette-Air & Cosmos No. 1386, Jul. 1992, p. 4, "Model2" French Journal: Gazette-Air & Cosmos No. 1386, Jul. 1992, p. 4.

(Continued)

*Primary Examiner*—Benjamin P Lee

(57) ABSTRACT

"T-tailed Deltoid Main Wing" idea allows for design of high-subsonic passenger aircraft with a capacity between 200 and 650 passengers with outer dimensions fitting within 80 m box on class VI airports while having more than twice lower fuel consumption per unit of payload when compared to the present classical-concept aircraft with fuselage that have the same passenger capacity. T-tailed deltoid main wing aircraft is satisfying all safety requirements for a passenger aircraft while having over 50% longer range than the aircraft of equivalent capacity with fuselage. Simple aerodynamic and structural solutions of T-tailed deltoid main wing aircraft are resulting with low development risks and production cost. Simple and reliable flight control systems of aircraft that are based on T-tailed deltoid main wing aerodynamic configuration allow for design of all-purpose, high-lift-capacity, and long range unmanned aircraft.

1 Claim, 10 Drawing Sheets

U.S. PATENT DOCUMENTS

| | | |
|---|---|---|
| 4,149,688 A | 4/1979 | Miller, Jr. |
| 5,082,204 A | 1/1992 | Croston |
| D326,081 S * | 5/1992 | Cathers et al. ............. D12/333 |
| 5,893,535 A | 4/1999 | Hawley ....................... 244/119 |
| 5,909,858 A | 6/1999 | Hawley ....................... 244/36 |
| 6,098,922 A | 8/2000 | Hahl |
| D455,389 S | 4/2002 | Billington |
| 6,527,224 B2 * | 3/2003 | Seidel ....................... 244/53 B |
| 6,568,632 B2 * | 5/2003 | Page et al. .................... 244/36 |
| 6,578,798 B1 | 6/2003 | Dizdarevic |
| 6,595,466 B2 * | 7/2003 | Depeige et al. .......... 244/118.3 |
| 6,666,406 B2 | 12/2003 | Sankrithi |
| 6,708,924 B2 | 3/2004 | Page |
| 6,923,403 B1 | 8/2005 | Dizdarevic |
| 7,093,798 B2 * | 8/2006 | Whelan et al. .............. 244/120 |

FOREIGN PATENT DOCUMENTS

| | | |
|---|---|---|
| WO | WO2007100271 | 9/2007 |

OTHER PUBLICATIONS

Robert H. Liebeck, "Design of the Blended Wing Body Subsonic Transport", Journal of Aircraft, vol. 41, No. 1, Jan.-Feb. 2004, p. 10-25.

* cited by examiner

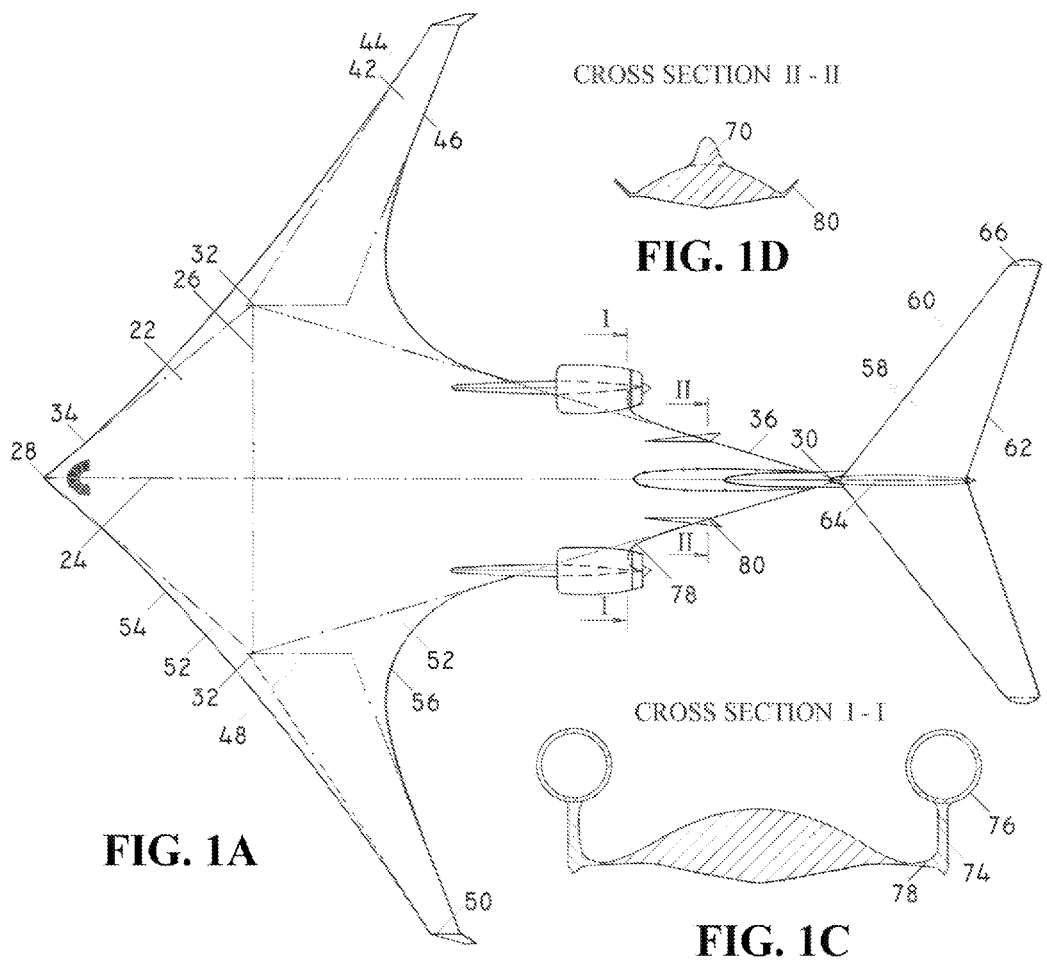
FIG. 1D
FIG. 1A
FIG. 1C
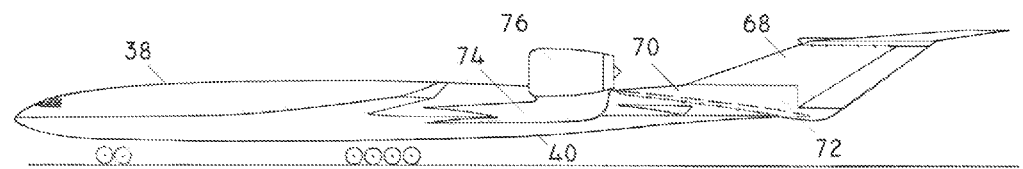
FIG. 1B

LEGEND:
- PASSENGER AISLE
- GALLEY
- CARRY-ON LUGGAGE
- LAVATORY
- LUGGAGE
- FOLDED SEATS
- FUEL

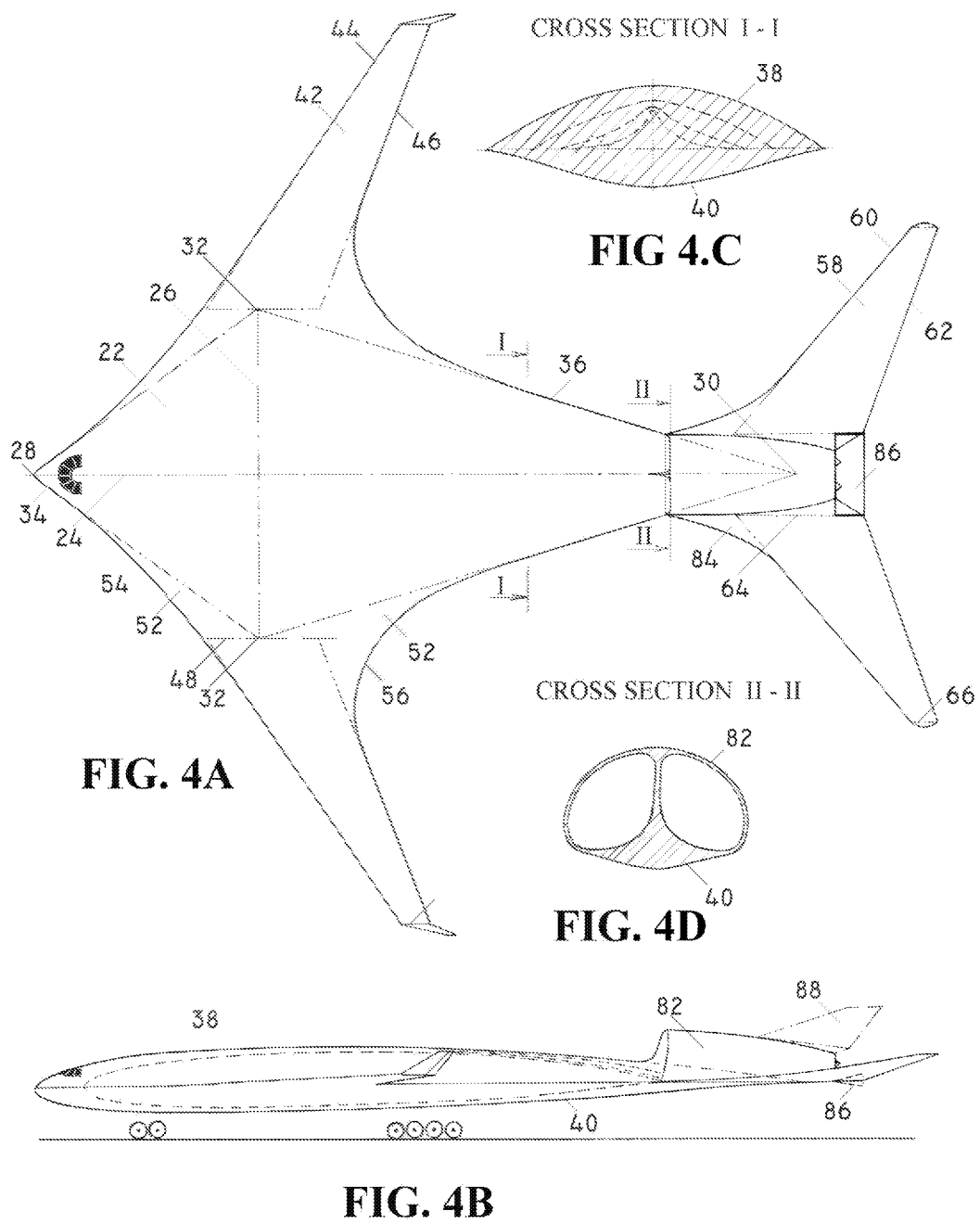

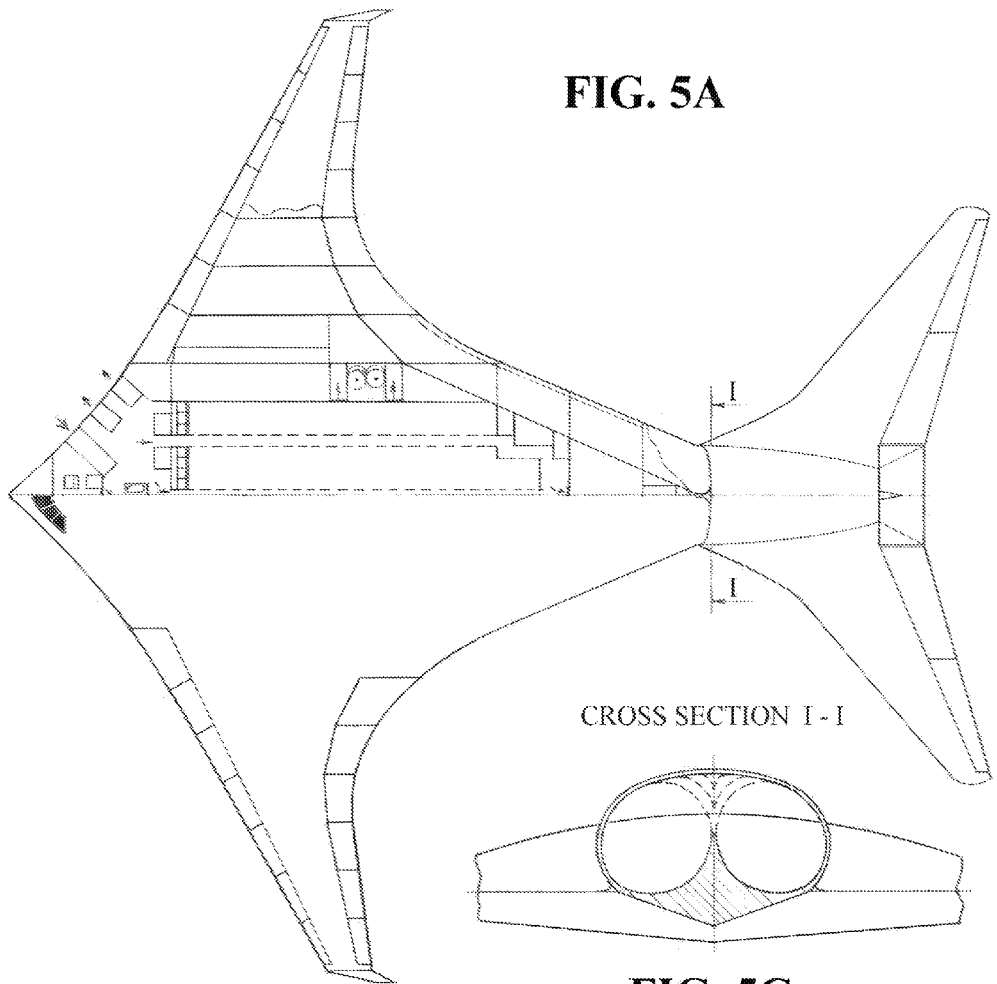
FIG. 5A
CROSS SECTION I - I
FIG. 5C
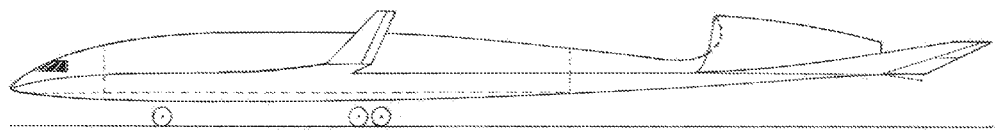
FIG. 5B

DELTOID MAIN WING AERODYNAMIC CONFIGURATIONS

BACKGROUND OF THE INVENTION

The flying wing idea was born in the early historical phase of the aircraft development with the goal to eliminate all external sections that do not participate actively in the lift production, hence minimizing drag, increasing lift capacity, and reducing the fuel consumption. Initially, the flying wing idea anticipated only wings with power plant without fuselage and tails. The elimination of fuselage required a certain increase of the chords and thickness of wings in order to provide for required payload accommodation. The increase of wing chords is increasing the airlifting surface area of wings. The increased surface area of wings that substitutes fuselage provides for either a higher lift capacity or ability to fly at lower attack angles, thereby resulting with lower profile, induced, and friction drag. The increased thickness of the wings in the payload area is resulting with increased relative thickness of airfoils and consequently increased profile drag.

The absence of fin with rudder did not cause serious repercussions relative to directional stability considering a low lateral aerodynamic reflection of wings. The yaw maneuver is controlled by differential drag on outer wings that is generated by spoilers or split elevons. A long distance between outer wings and aircraft gravity center in the lateral direction provides for a relatively satisfactory yaw maneuver.

However, the absence of the tailplane of "Tailess Flying Wing" concept is having significant negative effects on flight efficiency, as well as the maneuver and flight safety of such aircraft. The tailplane is capable to perform its functions successfully only if located at a great distance aft of the mean aerodynamic chord of the airlifting surface and aircraft gravity center. The classical wing forms without fuselage did not provide for such position of the tailplane, hence the classical flying wing concept has been developed mainly without tail. A significantly increased relative thickness of airfoils and the absence of the efficient pitch control functions of the tailplane have been the biggest constraints of the flying wing idea that prevented it from being widely implemented for mass air transportation despite great initial promises.

The first ideas as to how to practically realize the idea of flying wing into realistic projects for air transportation date back to early thirties of the 20th century. In the period of more than 80 years, these ideas have not been transformed into realistic projects except for sporadic pioneering attempts. The biggest accomplishment, by all means, has been achieved with B-2 aircraft, which was developed for specialized military purposes. However, this aircraft does not meet longitudinal dynamic stability requirements for civil aviation, while being prohibitively expensive, hence it does not represent a serious theoretical and practical base for development of the flying wing aircraft for civil mass air transportation. The latest project related to the flying wing concept for civil air transportation is the Boeing's BWB-450 baseline version that is based on the "Tailess Flying Wing" concept, which despite significant improvements relatively to the prior BWB generations did not resolve the key shortcomings and limitations when compared to the classical concept aircraft as follows:

It does not provide for a realistic position of gravity center with positive static margin due to unfavorable longitudinal distribution of payload, fuel, and airframe mass relatively to the neutral point, hence consequently being dynamically unstable in longitudinal direction.

It does not allow for the utilization of efficient airfoils with aft camber due to the fact that the neutral point and gravity center of the aircraft are significantly shifted in forward direction relatively to the mean aerodynamic chord. The longitudinal static stability of the BWB-450 aircraft in cruising conditions is possible to achieve by mostly using reflexed airfoils that have their air pressure center shifted in fore direction. Reflexed airfoils have a significantly lower efficiency at high subsonic and transonic speeds, thus considerably decreasing the initial advantages of the BWB concept.

It does not allow for the utilization of trailing edge flaps at low speeds during takeoff and landing, which in turn calls for a flight profile with high attack angles during landing, thus having significant negative repercussions on flight safety and ride quality.

It has a significantly lower longitudinal trim efficiency in cruising flight conditions due to a short distance of trim surfaces from the aircraft gravity center and the long mean aerodynamic chord of the airlifting surface.

It has a significantly lower level of longitudinal maneuverability especially at low flight speeds due to a short distance of maneuvering surfaces from the aircraft gravity center.

In addition, the problem related to high relative thickness of airfoils in the payload area was not satisfactorily resolved despite certain improvements relatively to the previous BWB generations. It remained significantly higher when compared to the relative thickness of airfoils that are used on the wings of classical concept aircraft. The relative thickness of airfoils in the payload area of the BWB concept is in the range between 10% and 15%, which is significantly increasing the compression and wave drag at flight speeds over Mach 0.8, thereby additionally decreasing the aircraft efficiency.

The significant negative aspects in connection with the efficiency and flight safety of the "Tailess Flying Wing" concept, which are related to inability to provide for efficient pitch control without tailplane resulted with the emergence of various hybrid versions of the flying wing concept with the tailplane. The hybrid versions of the flying wing concept with tailplane had a goal to provide for a high aircraft aerodynamic efficiency and a satisfactory pitch control. A high efficiency of the aircraft implies as low airlifting surface area thereof as possible for a designed payload capacity, the lowest possible relative thickness and efficient shapes of airfoils, as well as a smooth aerodynamic shape in lateral direction across the span. A high pitch control efficiency of the tailplane requires the longest possible distance between the mean aerodynamic chord of the tailplane and the mean aerodynamic chord of the airlifting surface, as well as the longest possible distance between the tailplane and the aircraft gravity center.

U.S. Pat. Nos. 2,557,962; 2,616,639; 3,216,673; D198,610; 3,608,850; 3,630,471; 3,869,102; 6,098,922; 6,666,406B2, which refer to the hybrid versions of the flying wing with tailplane represent attempts to convert the classical forms of the aircraft with tailplane into hybrid versions of the flying wing by completely or partially reshaping the fuselage into airlifting surfaces. The tailplane is joined the fuselage lifting body either directly or by means of extended nacelles or vertical tails. The positive effects are reflected in the increase of aircraft payload capacity for the approximately same external dimensions, which is one of the goals of the flying wing idea. However, the following are the negative effects of designs that were presented in the above patents:

The application of thick airfoils due to short chords in the payload area, thereby reducing the aerodynamic efficiency at higher subsonic speeds.

Rough aerodynamic transitions in lateral direction between the airlifting surface of fuselage and the airlifting surface of outer wings, thereby drastically increasing the interference drag and resulting with more complex airframe configurations from the manufacturing point.

All aerodynamic shapes from the prior art listed above are configured for low subsonic speeds only, which limits their application range.

One of the most recent attempts to affirm the flying wing idea for highly efficient high-subsonic and transonic civil air transportation is reflected in U.S. Pat. No. 6,923,403 named "Tailed Flying Wing Aircraft" where smoothly integrated trapezoidal outer wings with elongated central airlifting section create a unique aerodynamically efficient airlifting body by way of transition sections. A significant sweepback angle of the central section leading edge, as well as a semi-elliptical convexly elongated trailing edge in the aft direction have considerably extended the chord lengths of the central section and provided for payload disposal within airlifting surface that is defined with significantly thinner airfoils when compared to BWB's tailess concept aircraft. On the other hand, the trailing edge of the "Tailed Flying Wing Aircraft", which is significantly elliptically and convexly elongated in aft direction allowed for the tailplane to be positioned significantly aft of the mean aerodynamic chord of airlifting surface, thus shifting the neutral point of the aircraft in aft direction, hence allowing for the realistic position of aircraft gravity center in front of the neutral point, thereby providing for required longitudinal dynamic stability of civil aircraft, which was impossible to achieve with "Tailess Flying Wing" concepts. Additionally, the convexly elliptical form of the rear portion of the central section of "Tailed Flying Wing Aircraft" provided for almost elliptical span wise lift distribution, hence generating a low induced drag.

However, a more detailed and encompassing aerodynamic analyses of this concept showed that the longitudinal position of the tailplane, which depends on the semi-elliptical form of the central section trailing edge was not sufficiently shifted in aft direction to provide for the application of efficient supercritical airfoils in the payload area including the inability to deploy trailing edge flaps during landing and take-off for the same reason. The further elongation of semi-elliptical trailing edge of the central section with intention to additionally shift the tailplane in the aft direction would inefficiently increase the area of the airlifting surface, thereby increasing the friction drag and significantly decreasing the positive effects gained by shifting the tailplane in aft direction. This clearly led to the conclusion that it was necessary to find a more efficient form for the central section of the airlifting surface to which the tailplane is joined.

BRIEF SUMMARY OF THE INVENTION

My "Deltoid Main Wing" idea is providing for the following advantages:
a) Ability to design large aircraft with much higher aerodynamic efficiency when compared to classical-concept aircraft with the same level of flight safety including a higher aerodynamic efficiency with much higher flight safety when compared to tailess flying wing aircraft.
b) Ability to design large aircraft with much higher range and payload capacity, while having the same external dimensions when compared to classical-concept aircraft.
c) Ability to design large aircraft with much higher economical cruising speed when compared to both tailess flying wing and classical-concept aircraft.
d) Ability to design simple airframes for large aircraft whose shape is much more favorable for the application of advanced composite materials, hence resulting with much lighter airframe and lower production cost when compared to cigar-shaped fuselage of classical concept aircraft.
e) Ability to design all-size and all-purpose unmanned aircraft with much higher payload capacity and longer range that have simple, efficient, and reliable flight controls.

Accordingly, besides the objects and advantages of the patents described above in my patent application, the several objects of my "Deltoid Main Wing" idea are:
1. Identify the most favorable geometrical shape of the centerbody planform of flying wing aircraft that will simultaneously provide for the following:
   a. A simple centerbody planform with the straight lines of leading and trailing edge in order to result with the simplest and the most aerodynamically efficient three-dimensional configuration of the centerbody.
   b. The longest possible chord lengths of the centerbody near symmetry axis in order to provide for the largest space possible for payload accommodation in the longitudinal direction within the aerodynamic contour that is defined with thin and efficient airfoils.
   c. The smallest possible surface area of the centerbody for a predetermined payload capacity.
   d. The longest distance of the tailplane in aft direction or canard in the forward direction from the mean aerodynamic chord of the airlifting surface in order to achieve the highest possible tailplane or canard efficiency with respect to aircraft pitch control.
   e. The easiest and aerodynamically most efficient integration of tailplane or canard with the rest of aerodynamic surface area.
2. Identify the most aerodynamically efficient geometric shape of the centerbody planform of flying wing aircraft with flexible and simple geometry that is defined with the fewest possible number of geometrical variables to be used for the optimization of aerodynamic variables including the airlifting surface area of the centerbody, the size and position of the mean aerodynamic chord of the centerbody, the relative thickness of the centerbody airfoils for a predetermined height of the payload area, the leading and trailing edge sweep angle of the centerbody, the longitudinal position of the outer wings relatively to the mean aerodynamic chord of the centerbody, the longitudinal position of the tailplane or canards relatively to outer wings, as well as the longitudinal position of the tailplane or canards relatively to the mean aerodynamic chord of the airlifting surface and gravity center of the flying wing aircraft in order to provide for a simple and efficient mathematical model for aerodynamic optimization of the flying wing aircraft for a wide array of applications.
3. Research and develop the most efficient aerodynamic, as well as the simplest and most flexible geometric forms for connecting means between the tailplane or canard and the centerbody in a wide range of configurations in order to achieve the maximum overall aircraft efficiency and simultaneously meet all safety requirements related to pitch control of aircraft in all flight regimes. The connecting means between the tailplane or canards and the centerbody should provide for the optimal distribution of their own aerodynamic and inertia forces, as well as the aerodynamic and inertia forces of the tailplane and canards into the airframe of the centerbody in order to result with the minimal weight of the aircraft airframe. In addition to the connecting role between the tailplane or canards and the centerbody, the above connecting means have their own aerodynamic role relative to the achievement of high aircraft performance.

Still further objects and advantages will become apparent from a consideration of the ensuing description and drawings. Although description contains many specifics, these should not be construed as limiting the scope of the invention but as merely providing illustrations of some of the presently preferred embodiments of the invention. Thus, the scope of the invention should be determined by the appended claims and their legal equivalents rather than by given examples.

SHORT DESCRIPTION OF DRAWINGS

FIG. 1 shows an aircraft that is based on the T-tailed Deltoid Main Wing (TDMW) aerodynamic configuration. It shows the top and lateral view, as well as two cross sections in order to clearly present the shape and position of all major aerodynamic sections of the TDMW aerodynamic configuration.

FIG. 4 shows an aircraft that is based on Finless Tailed Deltoid Main Wing (FTDMW) aerodynamic configuration where the tailplane is joined deltoid main wing by a rigid airframe of the integral jet engines nacelle. This drawing shows a top and a lateral view, as well as two cross-sections in order to clearly present the shape and position of all major aerodynamic sections of the FTDMW aerodynamic configuration.

FIG. 5 shows a long range high-subsonic passenger aircraft that is based on the FTDMW aerodynamic configuration. The aircraft size is optimized for the capacity of 250 passengers in a 3-class arrangement, while having up to 330 passengers in a single economy class arrangement. Such smaller aircraft has no cargo compartments under passenger seating area in order to keep the relative thickness of deltoid main wing airfoils under 9%.

Figure 6A:
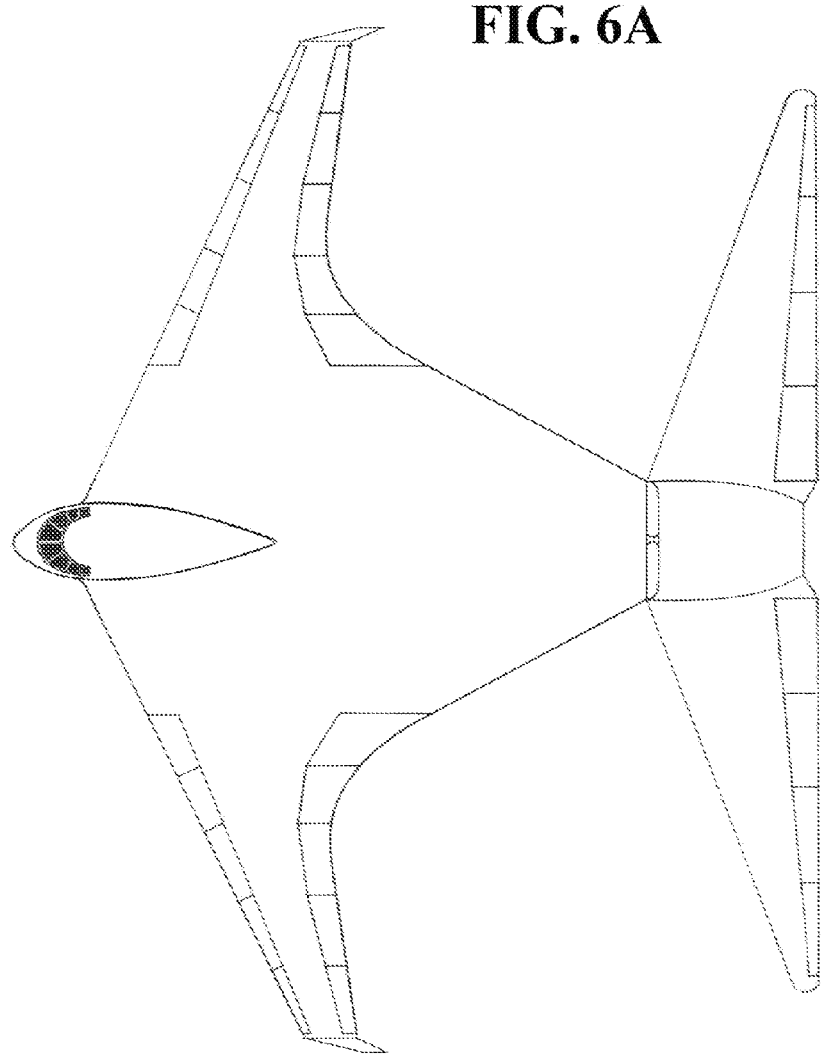
Figure 6B:
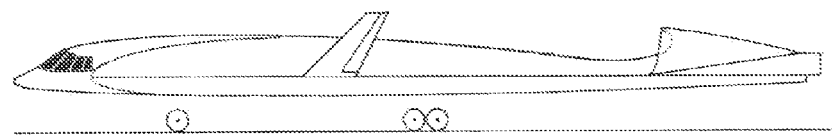

FIG. 6 shows a low dynamically stable aircraft based on the FTDMW aerodynamic configuration where the geometrical proportions and positions of basic airlifting surfaces relatively to the aircraft gravity center are allowing to deploy a tailplane with a positive lift coefficient in cruising conditions, hence the tailplane being the rear wing of aircraft, thus the FTDMW aerodynamic configuration being converted into the Longitudinal Double Wing (LDW) aerodynamic configuration.

Figure 7A:
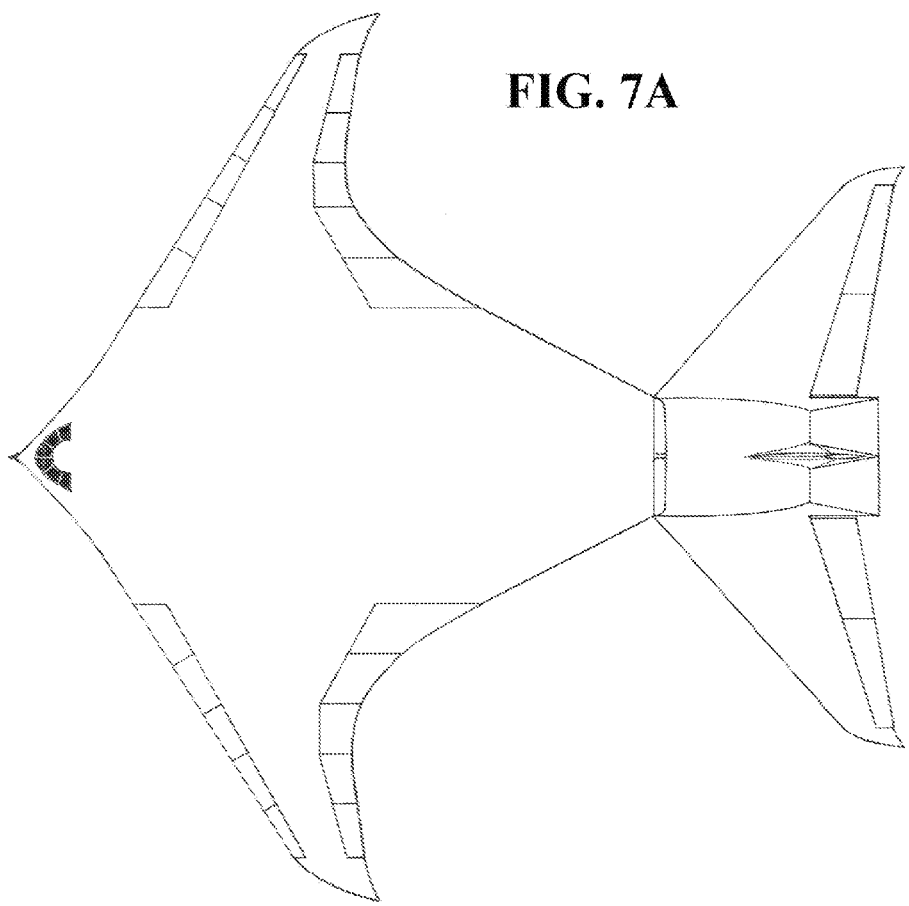
Figure 7B:
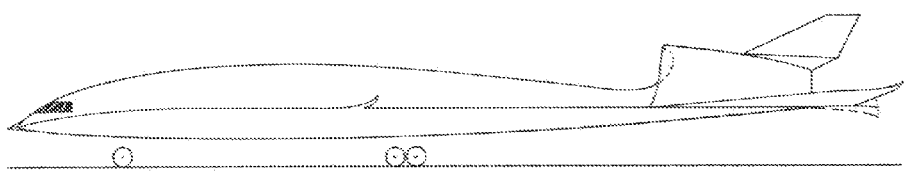

FIG. 7 shows a high-subsonic long-range strategic bomber that is based on the LDW aerodynamic configuration with a positive lift coefficient of the rear wing of up to 50% of the lift coefficient of the front wing. The aircraft is optimized to have a high lift capacity with low radar, infra-red, and visible reflection, as well as a high level of maneuverability around all three axes.

Figure 8A:
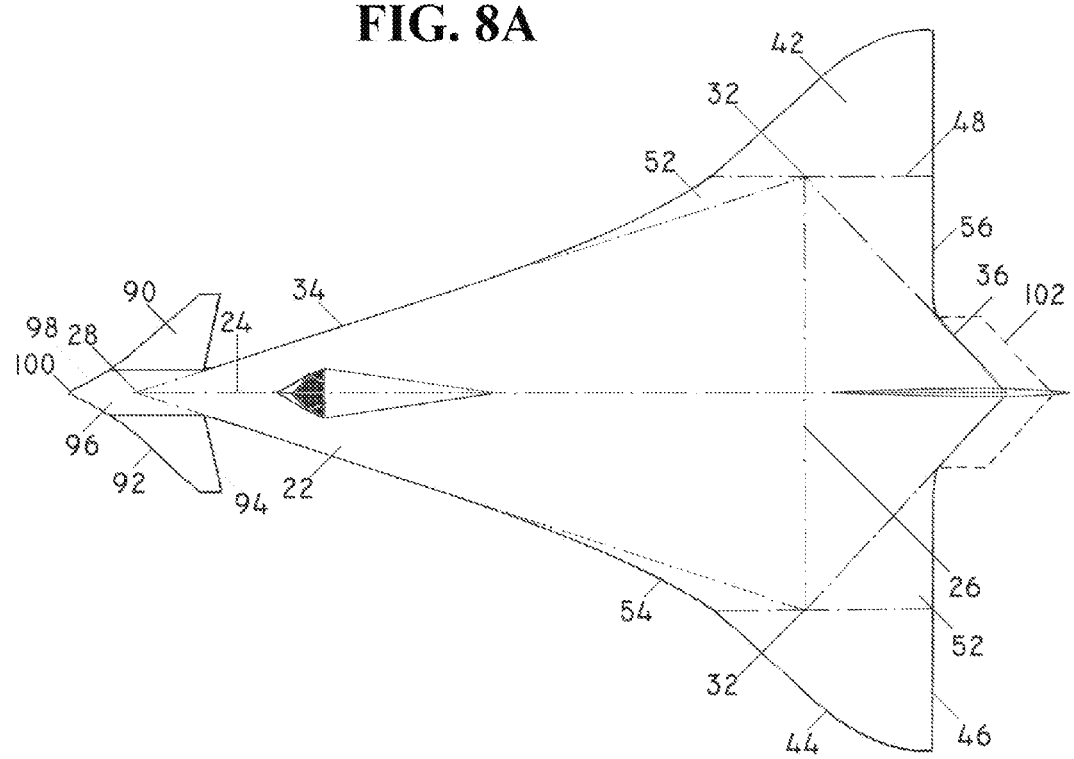
Figure 8B:
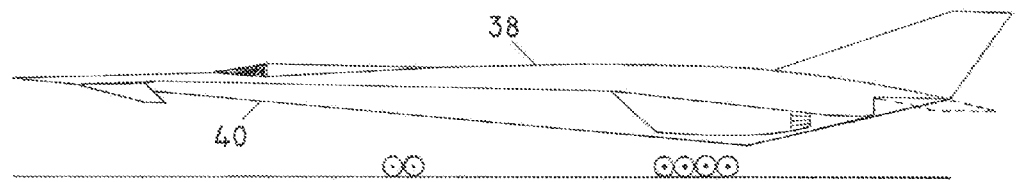

FIG. 8 shows an aircraft that is based on Canard Deltoid Main Wing (CDMW) aerodynamic configuration that is favorable for design of supersonic flying wing aircraft.

Figure 9A:
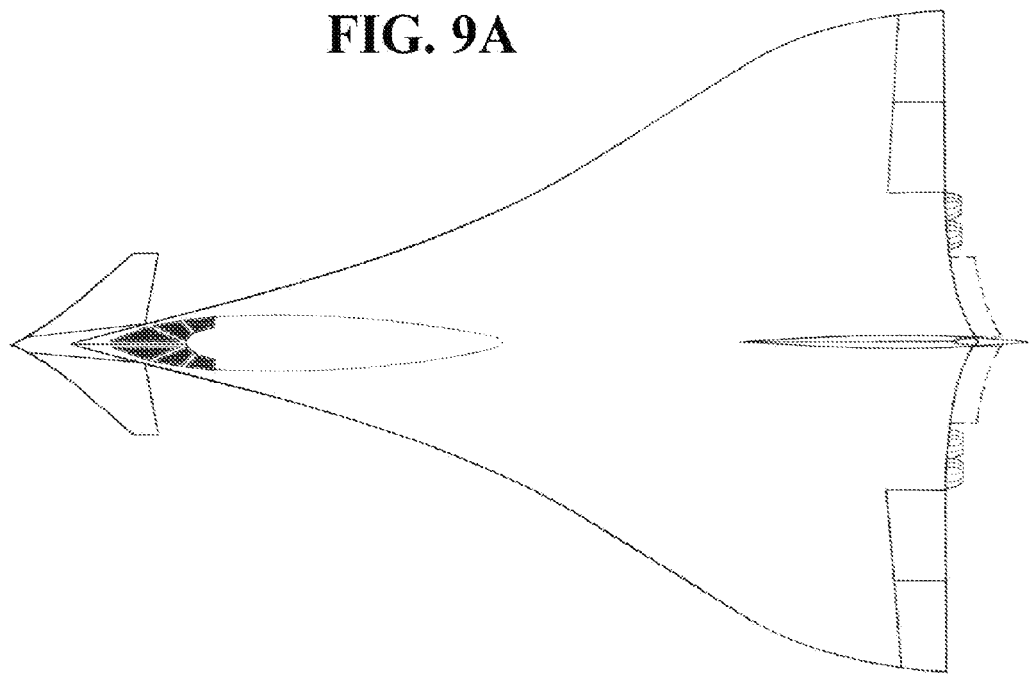
Figure 9B:
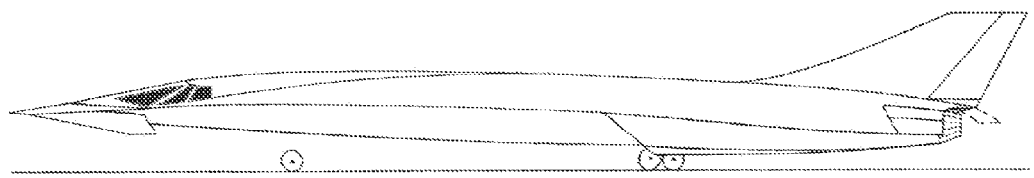
Figure 9C:
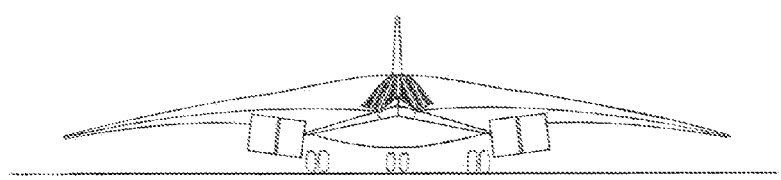

FIG. 9 shows three basic views of a long-range supersonic passenger aircraft that is based on the CDMW aerodynamic configuration. It is configured as a business aircraft with up to 130 seats, while being optimized for the speed of over Mach 2.5 and the flight at the altitude of over 20,000 meters.

Figure 10A:
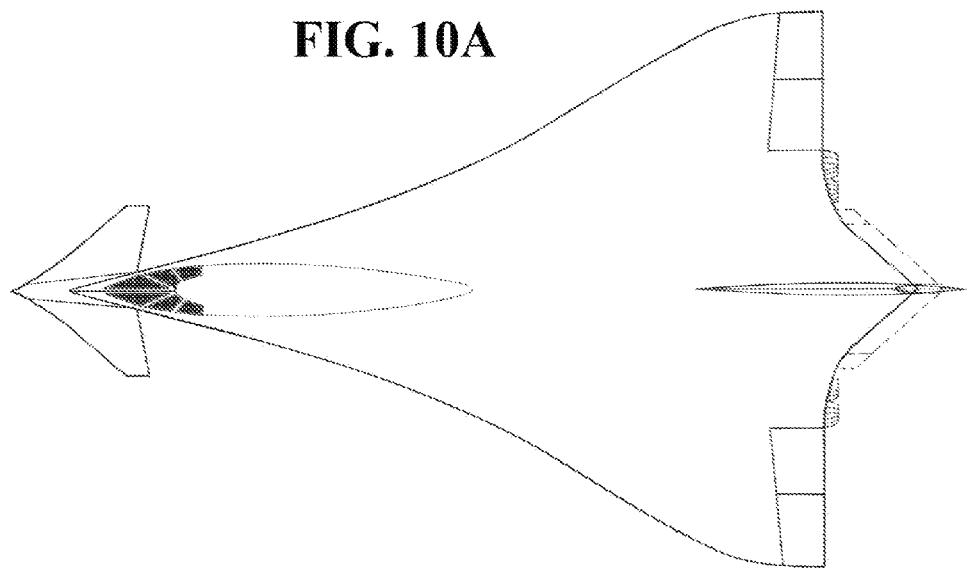
Figure 10B:
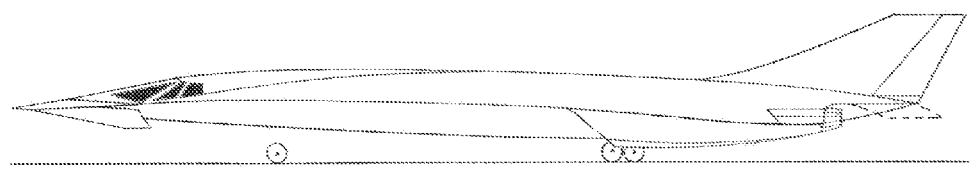
Figure 10C:
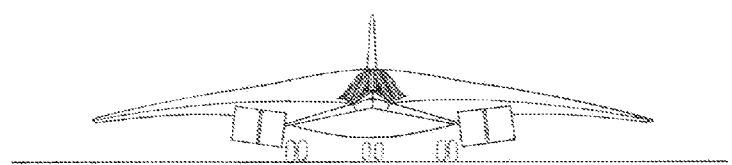

FIG. 10 shows three basic views of a strategic supersonic bomber that is based on the CDMW aerodynamic configuration. This aircraft is designed to have a high lift capacity, long-range, low radar and visual reflection, high level of maneuverability at combat speed, and economical cruising speed of over Mach 2.5.

| REFERENCE NUMERALS IN DRAWINGS | |
|---|---|
| 22 | deltoid main wing |
| 24 | deltoid longitudinal diagonal |
| 26 | deltoid transversal diagonal |
| 28 | longitudinal diagonal leading tip |
| 30 | longitudinal diagonal trailing tip |
| 32 | transversal diagonal lateral tips |
| 34 | main wing leading edge |
| 36 | main wing trailing edge |
| 38 | main wing upper surface |
| 40 | main wing under surface |
| 42 | outer wings |
| 44 | outer wings leading edge |
| 46 | outer wings trailing edge |
| 48 | outer wings root airfoil |
| 50 | outer wings tip airfoil |
| 52 | wing transition sections |
| 54 | wing transition sections leading edge |
| 56 | wing transition sections trailing edge |
| 58 | tailplane |
| 60 | tailplane leading edge |
| 62 | tailplane trailing edge |
| 64 | tailplane root airfoil |
| 66 | tailplane tip airfoil |
| 68 | fin with rudder |
| 70 | fin leading edge strake |
| 72 | fin root section |
| 74 | jet engine pylons |
| 76 | jet engine nacelles |
| 78 | jet engine pylon transition sections |
| 80 | lateral airflow deflectors |
| 82 | integral jet engine nacelle |
| 84 | tailplane leading edge strake |
| 86 | pivotal central pitch control section |
| 88 | pivotal vertical rudder |
| 90 | canard |
| 92 | canard leading edge |
| 94 | canard trailing edge |
| 96 | canard transition section |
| 98 | canard transition section leading edge |
| 100 | canard transition section nose |
| 102 | retractable trailing edge flaps |

DETAILED DESCRIPTION OF THE INVENTION

FIG. 1 shows a TDMW aircraft, which represents an innovative and advanced aerodynamic concept for large high-subsonic and transonic aircraft with economical cruising speed of up to Mach 0.9. The main innovation of this novel and advanced aerodynamic concept refers to a new and innovative shape of the airlifting surface, a new and innovative integration of jet engines with the airlifting surface, as well as a new and innovative integration of tailplane (58) with the airlifting surface, which provides for a high aerodynamic efficiency at high subsonic and transonic speed, as well as a high flight performance in all flight regimes, while meeting all safety requirements for civil air transportation.

Main wing (22), two outer wings (42), two outer wing transition sections (52), and two jet engine pylon transition sections (74) are smoothly integrated into a single integral airlifting surface of the TDMW aircraft. Main wing (22) is the largest section of the integral airlifting surface. The planform of main wing (22) is designed as a deltoid that is defined with longitudinal diagonal (24) and transversal diagonal (26). Longitudinal diagonal (24) coincides with the airflow direction and lies in the symmetry plane of the aircraft. The length of longitudinal diagonal (24) is determined by the distance between longitudinal diagonal leading tip (28) and longitudinal diagonal trailing tip (30). The length of transversal diagonal (26) is determined by the distance between two transversal diagonal lateral tips (32). Longitudinal diagonal (24) divides transversal diagonal (26) in half. Longitudinal diagonal (24) may have different longitudinal positions relatively to transversal diagonal (26). Longitudinal diagonal (24) is in an aft position relatively to transversal diagonal (26) when trailing tip (30) is farther away from transversal diagonal (26) than leading tip (28), while longitudinal diagonal (24) is in a forward position relatively to transversal diagonal (26) when leading tip (28) is farther away from transversal diagonal (26) than trailing tip (30). Two straight lines that connect leading tip (28) with two lateral tips (32) are defining main wing leading edge (34), while two straight lines that connect trailing tip (30) with two lateral tips (32) are defining main wing trailing edge (36). Main wing leading edge (34) is having a sweepback, while main wing trailing edge (36) is having a forward sweep.

The length of longitudinal diagonal (24), the length of transversal diagonal (26), and the longitudinal position of longitudinal diagonal (24) relatively to transversal diagonal (26) are the only three geometric variables that are fully defining the planform of deltoid main wing (22). The lengths of longitudinal diagonal (24) and transversal diagonal (26) are determining the aerodynamic surface area of main wing (22), while the lengths of longitudinal diagonal (24) and transversal diagonal (26) together with the longitudinal position of longitudinal diagonal (24) are determining the sweepback angle of main wing leading edge (34) and the forward sweep angle of main wing trailing edge (36). The above three geometric variables of main wing (22) are used for the aerodynamic optimization of the TDMW aircraft, whereby affecting the aerodynamic variables and flight performance of the aircraft as described below.

The change in the length of transversal diagonal (26) is affecting the following:
  a. The change of the aerodynamic surface area of main wing (22), thus changing the surface area of the integral airlifting surface and consequently the lift capacity. The change of the aerodynamic surface area of main wing (22) is changing the wetted area and consequently the friction drag of the TDMW aircraft. Furthermore, the change of the airlifting surface area is indirectly affecting the efficiency of tailplane (58) relative to pitch control and longitudinal dynamic stability of the TDMW aircraft.
  b. The change of the sweepback angle of main wing leading edge (34), thus changing the compression and wave drag of the TDMW aircraft at high subsonic and transonic speed.
  c. The change of the forward sweep angle of main wing trailing edge (36), thus affecting the vortex activity around main wing trailing edge (36) and consequently changing the induced drag of the TDMW aircraft.

Although the aerodynamic optimization of the TDMW aircraft is performed by simultaneously utilizing all of the above three geometric variables of deltoid main wing (22), generally speaking, the higher cruising speed the shorter transversal diagonal (26).

The change in the length of longitudinal diagonal (24) is affecting the following:
  a. The change of the aerodynamic surface area of main wing (22) with aerodynamic consequences as previously referred to with respect to transversal diagonal. However, since longitudinal diagonal (24) of the TDMW aircraft is much longer than transversal diagonal (26), the change of aerodynamic surface area is smaller for the same change in length. Therefore, this variable is usually not used for friction drag optimization.
  b. The change in the length of the airfoil chord in the vicinity of the symmetry plane where payload is accommodated for, thus affecting simultaneously both the relative thickness of airfoils in the payload area, as well as the length and size of payload area. For example, the elongation of longitudinal diagonal (24) is reducing the relative thickness of airfoils and increasing the length and area for payload accommodation, thus generating simultaneously two positive effects including the reduction of profile drag, especially compression and wave drag at high speed, as well as the increase in payload capacity, thereby significantly increasing the fuel consumption per unit of payload.
  c. The change of the sweepback angles of main wing leading edge (34) and the forward sweep angle of main wing trailing edge (36), thus affecting the wave and induced drag of the TDMW aircraft.

The length of longitudinal diagonal (24) is one of the most powerful variables for the aerodynamic optimization of aircraft that are based on the TDMW aerodynamic concept. Generally, the higher cruising speed of the aircraft the higher ratio between the lengths of longitudinal diagonal (24) and transversal diagonal (26). The longitudinal position of longitudinal diagonal (24) relatively to transversal diagonal (26) is usually selected after the length of longitudinal diagonal (24) is already determined.

The change of the longitudinal position of longitudinal diagonal (24) relatively to transversal diagonal (26) is affecting the following:
  a. The simultaneous change of the sweepback angle of main wing leading edge (34) and the forward sweep angle of main wing trailing edge (36) in the opposite direction. If the change is done by shifting longitudinal diagonal (34) forward then the sweepback angle of main wing leading edge (34) is increased, whereas the forward sweep angle of main wing trailing edge (36) is decreased. The outcome is opposite when longitudinal diagonal (24) is shifted in the aft direction.
  b. The change in the longitudinal distance of tailplane (58) from outer wings (42) and wing transition sections (52) where trailing edge flaps are situated, thus affecting the range of motion of trailing edge flaps and consequently the flight angle of aircraft at low speed, thereby affecting the passenger ride quality, flight safety, as well as the length of takeoff and landing runway, while further affecting the change in the longitudinal distance between tailplane (58) and the gravity center of aircraft, hence affecting the level of aircraft pitch maneuver. It is also affecting the distance between the gravity center and neutral point, hence affecting the level of longitudinal dynamic stability of aircraft. The change of longitudinal position of the neutral point and gravity center along the mean geometric chord of the integral airlifting surface is affecting the application level of supercritical airfoils across the span of the integral airlifting surface, while consequently further affecting the aerodynamic efficiency of the TDMW aircraft.

Although the longitudinal position of longitudinal diagonal (24) relatively to transversal diagonal (26) is optimized together with other geometric variables, generally, longitudinal diagonal (24) of the TDMW aircraft has a distinct aft position relatively to transversal diagonal (26).

Cross-sections of main wing (22) are shaped as airfoils in the airflow direction. The shapes of the main wing airfoils are additional geometric variables that are required for a full aerodynamic definition of main wing (22). The geometry of main wing airfoils should allow for payload accommodation, aerodynamic efficiency, and simple 3-D shape of main wing (22) that is favorable from the manufacturing aspect.

Outer wings (42) are the second largest sections of the integral airlifting surface of TDMW aircraft. Outer wings (42) are joined main wing (22) outboard of lateral tips (32). Outer wings (42) are having a similar planform and aerodynamic role as outboard wing sections of classical concept aircraft. In addition to lift production, outer wings (42) are used for lateral stability control and roll maneuver of the TDMW aircraft, hence ailerons and flaperons on the trailing edge thereof are required. Also, stall speed protection requires the installation of leading edge slats. The difference between outer wings (42) and the outboard wing sections of classical concept aircraft is related to the required level of aerodynamic loading. A significantly lower specific loading of integral airlifting surface and a significantly larger central section of integral airlifting surface is resulting with a significantly lower specific loading of outer wings (42) when compared to the outboard wing sections of classical concept aircraft. Therefore, outer wings (42) are having shorter chords and thinner relative thickness of airfoils than outboard wing sections of classical concept aircraft.

Additionally, the difference between outer wings (42) of the TDMW aircraft and the outboard wing sections of classical concept aircraft is related to their role in the aerodynamic optimization of aircraft. The role of outer wings (42) relative to the aerodynamic optimization of TDMW aircraft is much more complex and delicate than the role of outboard wing sections of classical concept aircraft. The outboard wing sections of classical concept aircraft are directly integrated with inner wing sections, thus the position and geometry of outboard wing sections have to follow strictly the geometry of inboard wing sections. It is only possible to separately adjust slightly the sweep angle of trailing edge and the span of outboard wing sections. Outer wings (42) of a deltoid main wing aircraft are fairly separate sections from main wing (22), which they touch in one point only, i.e. lateral tips (32). Therefore, it is possible to design the size, shape, and longitudinal position of outer wings (42) independently from main wing (22).

For this purpose, five geometric variables of the planform of outer wings (42) are available:

1. chord length of root airfoil (48)
2. chord length of tip airfoil (50)
3. distance between root airfoil (48) and tip airfoil (50) in transversal direction
4. sweep angle of outer wings leading edge (44)
5. longitudinal position of root airfoil (48) relatively to lateral tip (32)

These five geometric variables of outer wings (42) affect the aerodynamic variables of outer wings (42) and integral airlifting surface.

The change of chord lengths of root airfoil (48) and tip airfoil (50), as well as the distance in transversal direction between root airfoil (48) and tip airfoil (50) are affecting:

The aerodynamic surface area of outer wings (42), thus changing the area of integral airlifting surface and consequently the lift capacity of aircraft The span and aspect ratio of outer wings (42), thus changing the span and aspect ratio of the integral airlifting surface The aspect ratio of outer wings (42), thus changing the aspect ratio of integral airlifting surface and consequently induced drag of aircraft The length of the mean aerodynamic chord of outer wings (42), thus changing the mean aerodynamic chord of integral airlifting surface.

The sweep angle of outer wings leading edge (44), the chord length of root airfoil (48), and the chord length of tip airfoil (50) are affecting the aerodynamic sweep angle of outer wings (42), as well as the longitudinal position of the mean aerodynamic chord of outer wings (42) and consequently the longitudinal position of the mean aerodynamic chord of integral airlifting surface.

The longitudinal position of root airfoil (48) relatively to lateral tips (32) is additionally affecting the longitudinal position of the mean aerodynamic chord of outer wings (42) and consequently the longitudinal position of the mean aerodynamic chord of the integral airlifting surface, while all of the above five geometric variables of outer wings (42) are affecting the longitudinal position of the neutral point of the TDMW aircraft and consequently the required longitudinal position of the aircraft gravity center depending on the dynamic stability requirements. Furthermore, the longitudinal position of the aircraft gravity center along the mean aerodynamic chord of the integral airlifting surface is affecting the utilization of supercritical airfoils across the span of the integral airlifting surface of the TDMW aircraft.

All of the above mentioned aerodynamic variables of outer wings (42) are affecting friction, induced, compression, and wave drag, lateral stability, roll maneuverability, and longitudinal dynamic stability of aircraft, as well as the deployment level of means for extra lift production on outer wings (42). Since the geometric variables of outer wings (42) are affecting many of the aerodynamic variables that are also affected with the geometric variables of other aerodynamic sections of TDMW aircraft, the aerodynamic optimization of the aircraft by means of geometric variables of outer wings (42) needs to be done in unison with all other relevant geometric variables of aircraft.

Though the optimization of geometric variables of outer wings (42) is performed integrally together with other geometric variables of the TDMW aircraft, the geometric variables of outer wings (42) should follow the subsequent guidelines:

a. The aerodynamic surface area of outer wings (42) should be significantly smaller than the aerodynamic surface area of outboard wing section of classical concept aircraft with a shorter chord length of tip airfoil (50).

b. The aerodynamic sweepback angle of outer wings (42) should be approximately the same or smaller than the one of the outboard wing sections of classical concept high-subsonic and transonic aircraft in order to provide for a good aerodynamic efficiency of outer wings (42) at both high and low speeds, while allowing for deployment of trailing edge flaps across the entire span of outer wings (40).

c. The longitudinal position of root airfoil (48) should be shifted in forward direction relatively to trailing tip (30) of main wing (22) in order to shift the mean geometric chord of outer wings (42) forward as much as possible to allow for the utilization of supercritical airfoils across the entire span of outer wings (42), as well as deployment of trailing edge flaps during takeoff and landing.

In any case, the initial chord length of root airfoil (48) and especially the chord length of tip airfoil (50), as well as the span of outer wings (42) should satisfy the basic aerodynamic functions of outer wings (42) that are necessary to meet the required safety standards relative to the lateral stability and roll maneuverability of deltoid main wing aircraft especially during takeoff and landing.

The shape of the airfoils of outer wings (42) is an additional geometric variable used for the aerodynamic optimization of outer wings (42). One priority relative to the aerodynamic optimization of the TDMW aircraft is to utilize the supercritical airfoils across the span of outer wings (42).

Wing transition sections (52) are additional airlifting surfaces that allow for a smooth three-dimensional integration of deltoid main wing (22) and outer wings (42) into a large integral airlifting surface of the TDMW aircraft. The planform of wing transition sections (52) is determined by the size and shape of wing transition sections leading edge (54) and wing transition sections trailing edge (56). Wing transition sections leading edge (54) is tangentially joined main wing leading edge (34) and outer wings leading edge (44), while wing transition sections trailing edge (56) is tangentially joined main wing trailing edge (36) and outer wings trailing edge (46). The size and shape of wing transition sections leading edge (54) and wing transition sections trailing edge (56) are additional geometric variables used for the aerodynamic optimization of the integral airlifting surface of the TDMW aircraft.

The main role of wing transition sections leading edge (54) and wing transition sections trailing edge (56) is to provide for a smooth transition between main wing leading edge (34) and outer wings leading edge (44), as well as between main wing trailing edge (36) and outer wings trailing edge (46) in order to result with a smooth three-dimensional integration of main wing (22) and outer wings (42). For the same reason, the airfoils of wing transition sections (52) are created as a smooth airfoil family whose first airfoil is the same as the last airfoil in outboard direction of main wing (22), while the last airfoil is the same as the first airfoil of outer wings (42). The airfoil family is the additional geometric variable of wing transition sections (52) that provides for low interference drag between main wing (22) and outer wing (42), as well as a high aerodynamic efficiency of wing transition sections (52).

Wing transition sections (52) should have the most pronounced fore position possible relatively to aircraft gravity center to produce the highest possible positive pitch momentum together with the outboard portion of main wing (22) and the inner portion of outer wings (42) in order to compensate for the negative pitch momentum of the central portion of main wing (22) when efficient supercritical airfoils are used across the span of the integral airlifting surface in order to provide for the static stability of deltoid main wing aircraft during stationary flight regimes with the smallest possible negative aerodynamic lift coefficient of tailplane (58).

On the other hand, wing transition sections (52) with their large trailing edge flaps are dominant sections for extra lift production at low speed during takeoff and landing, which is the additional reason for which wing transition sections (52) should have a dominant forward position relatively to the gravity center of the deltoid main wing aircraft. Therefore, wing transition sections leading edge (54) and trailing edge (56) should be moved forward as much as possible, while having such shapes to provide for the maximum possible forward shift of the mean geometric chord of wing transition sections (52). The significant shift of the mean geometric chord of wing transition sections (52) in fore direction relatively to aircraft gravity center is possible only if outer wings root airfoil (48) is shifted in fore direction relatively to lateral tips (32). However, the shift of wing transition sections (52) and outer wings (42) in fore direction is shifting the neutral point of aircraft in fore direction as well, thus requiring the shift of the aircraft gravity center forward, thereby decreasing the positive effects of this optimization. Therefore, it has to be performed with the simultaneous involvement of other geometric variables of the deltoid main wing aircraft in order to shift the aircraft neutral point in aft direction.

Jet engine pylon transition sections (78) are small surface areas implanted between the inner side of jet engine pylons (74) and main wing (22) in the area where jet engine pylon (74) is overlapping main wing trailing edge (36). Jet engine pylon transition sections (78) are smoothly integrated with main wing (22) as a constituent part of the integral airlifting surface of TDMW aircraft. The main task of jet engine pylon transition sections (78) is the minimization of the airflow turbulence between jet engine pylon (74) and main wing (22), as well as the minimization of the vortex activity around main wing trailing edge (36).

Fin with rudder (68) is joined the rear portion of main wing (22) over main wing upper surface (38). Fin with rudder (68) except for its basic aerodynamic functions is having a crucial role as connecting means between main wing (22) and tailplane (58). The basic aerodynamic functions of fin with rudder (68) are related to directional control and yaw maneuver of TDMW aircraft as it is the case with classical concept aircraft. Additionally, fin with rudder (68) should provide for a viable connection between tailplane (58) and main wing (22), while simultaneously providing for a favorable position of tailplane (58) in longitudinal and vertical directions relatively to the integral airlifting surface of TDMW aircraft. Fin with rudder (68) is having fin leading edge strake (70) that is smoothly blended with fin root section (72). Fin leading edge strake (70) and fin root section (72) actually represent the upper reinforcement of the airframe of the rear portion of main wing (22), thus being fully integrated with the airframe of the rear portion of main wing (22) as shown in FIGS. 1B and 1D. Such reinforcement of the rear portion of main wing (22) should provide for a successful and efficient transfer of all aerodynamic and inertia forces of tailplane (58) and fin with rudder (68) into the main airframe of main wing (22) when fin with rudder (68) is at the outermost aft position relatively to main wing (22), while tailplane (58) is at the outermost aft position relatively to fin with rudder (68). Fin with rudder (68) is designed with the optimal aerodynamic sweep angle to provide for a high aerodynamic efficiency of fin with rudder (68) in all flight regimes, while simultaneously providing for the longest possible longitudinal distance of tailplane (58) from the mean aerodynamic chord of the integral airlifting surface and gravity center of the TDMW aircraft.

A significantly lower lateral aerodynamic reflection of main wing (22) when compared to the lateral reflection of the fuselage of classical concept aircraft, as well as a significantly shorter distance of engines from the symmetry plane and gravity center of the TDMW aircraft require a significantly smaller surface area of fin with rudder (68) relatively the classical concept aircraft with the same payload capacity. Consequently, fin with rudder (68) of the TDMW aircraft is more than twice shorter when compared to the same of the classical concept aircraft with the same payload capacity.

The low height together with increased chord lengths of fin with rudder (68) allow for design of a very strong and relatively light airframe of fin (68) that is capable of transferring aerodynamic and inertia forces of tailplane (58) into the airframe of main wing (22). Simultaneously, a significantly smaller aerodynamic surface area and height of fin with rudder (68) are generating a significantly lower lateral bending and torsion momentum into the airframe of the reinforced rear portion of main wing (22) during yaw maneuver, thus allowing for a relatively light airframe of the rear portion of main wing (22) despite its lower bending resistance in lateral direction.

A highly convex upper surface of the rear portion of main wing (22) in lateral direction whose lateral convex curvature is gradually increasing towards trailing tip (30) is providing for a very smooth aerodynamic integration of fin leading edge strake (70) and fin root section (72) with the rear portion of main wing (22), thus significantly reducing the interference drag between fin with rudder (68) and main wing (22).

Fin with rudder (68) as a large vertical aerodynamic surface that is smoothly aerodynamically shaped in airflow direction, as well as smoothly aerodynamically integrated with the rear portion of main wing (22) while extending far behind main wing (22) is acting as its smooth integral vertical aerodynamic extension, hence being a powerful vertical airflow deflector that is directing the main airflow without turbulence and vortices behind the large central section of main wing (22) in longitudinal direction, thus significantly reducing the induced drag of TDMW aircraft.

Tailplane (58) is placed on the top of fin with rudder (68) in order to be in the outermost aft position relatively to the mean aerodynamic chord of the integral airlifting surface of TDMW aircraft. A highly elevated position of tailplane (58) results with a high aerodynamic efficiency thereof in all flight regimes. Tailplane (58) is the most important aerodynamic section of the TDMW aircraft that is affecting longitudinal static and dynamic stability and pitch maneuver, while further providing for the application of supercritical airfoils across the integral airlifting surface and deployment of trailing edge flaps during takeoff and landing.

A long distance of tailplane (58) from the mean aerodynamic chord of the integral airlifting surface, a moderate size of the aerodynamic surface area of tailplane (58), which is approximately the size of the tailplanes of classical concept aircraft with the same payload capacity, as well as a relatively small surface area of the integral airlifting surface are the key aerodynamic features of the TDMW aerodynamic configuration, thus allowing for design of high subsonic and transonic flying wing aircraft for mass civil air transport with high efficiency, high payload capacity, and high flight safety.

The position of the neutral point of aircraft is the key aerodynamic variable by means of which tailplane (58) of the TDMW aircraft provides for the application of flying wing concept for civil air transportation. Namely, the longitudinal position of the neutral point of the tailess flying wing concept aircraft can not exceed approximately 25% of the mean aerodynamic chord of wings regardless of wing geometry. The safety requirements for civil aviation related to the longitudinal dynamic stability of aircraft require the aft position of aircraft gravity center to be in front of neutral point by at least 5% of the mean aerodynamic chord of entire wing. It means that the gravity center of the tailess flying wing aircraft should not exceed 20% of the mean aerodynamic chord of wings in aft direction. The first problem related to the application of the tailess flying wing concept for civil aviation is associated with inability to design aircraft airframe including the longitudinal distribution of equipment, avionics, payload, and fuel inside the wing airframe in such way to maintain the gravity center of aircraft within 20% of the mean aerodynamic chord of wing in all flight regimes. This is especially difficult to achieve with passenger aircraft where fuel needs to be separated laterally or aft of the area for passenger accommodation for safety reasons.

There have been three major obstacles in the past that prevented a wide application of the flying wing concept aircraft in civil air transportation:

1. Insufficient longitudinal dynamic stability of aircraft
2. A distinct forward position of aircraft gravity center relatively to the mean aerodynamic chord of wing that is resulting with inability to use efficient airfoils with aft camber across the wing span
3. Inability to deploy trailing edge flaps during takeoff and landing due to a distinct forward position of aircraft gravity center relatively to the trailing edge, hence requiring a high attack angle of aircraft during landing, thus resulting with low ride quality and flight safety.

The absence of a highly efficient tailplane for pitch control of aircraft in case of tailess flying wing concepts is resulting with a low level of pitch maneuverability especially at low speed, as well as a low longitudinal trim efficiency in cruising regime. Additionally, relatively short airfoil chords of wings in the payload area of the tailess flying wing concept requires a higher relative thickness of wing airfoils by 10%-17% in the payload area, thus resulting with a decrease of aircraft aerodynamic efficiency, especially at a higher speed. On the other side, the increase of airfoil chord lengths in the payload area would significantly increase wetted area, hence consequently decreasing the efficiency of such tailess flying wing aircraft.

Figure 2A:
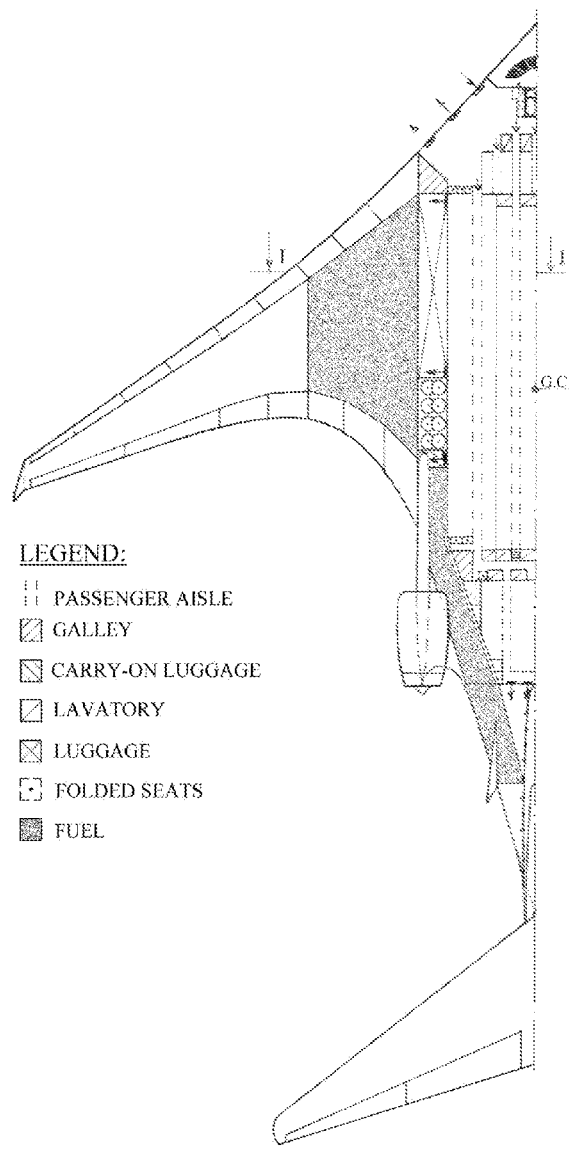
FIG. 2 shows a half of the top view, a half of the front view, and a half of the cross section in the payload area of a large passenger aircraft that is based on the TDMW aerodynamic configuration in order to clearly present the optimal solution for passenger, cargo, and luggage accommodation, as well as fuel disposal.

Tailplane (58) of the TDMW aircraft as shown in FIG. 1 is having such aerodynamic surface area and the longitudinal position thereof aft of aircraft gravity center to generate a higher pitch momentum than the tailplane of the classical concept aircraft with the same payload capacity. The aerodynamic surface area of tailplane (58), which is up to 10% larger when compared to the tailplane of the classical concept aircraft with the same payload capacity including the powerful aft position of tailplane (58) behind the mean aerodynamic chord of the integral airlifting surface is shifting the neutral point of the TDMW aircraft as shown in FIG. 1 in aft direction beyond 50% of the mean aerodynamic chord of the integral airlifting surface, thus allowing for the aft gravity center position to be set approximately between 48% and 50% of the mean aerodynamic chord while providing for at least +5% static margin. Unlike tailess flying wing aircraft, the above longitudinal position of the aircraft gravity center of the TDMW aircraft with a positive static margin is almost ideally matching the position of the real gravity center of airframe and payload as shown in FIG. 2, while providing for multiple options for a safe fuel disposal away from the payload area fore and aft of aircraft gravity center, thereby providing for the adjustment of the optimal position of aircraft gravity center in all flight regimes. Simultaneously, a significantly shifted gravity center of the TDMW aircraft in aft direction when compared with the tailess flying wing aircraft, as well as a very long distance between tailplane (58) and the aircraft gravity center (more then 30% longer relatively to the classical concept aircraft) are allowing for the application of highly efficient supercritical airfoils across the entire span of the integral airlifting surface with low aerodynamic loading of tailplane (58). For example, the application of selective family of supercritical airfoils with air pressure center positions from 50% to 65% of airfoil chord across the span of the integral airlifting surface would require a very low negative loading of tailplane (58) in cruising speed configuration (over 12 times lower than the loading of the classical concept aircraft wing in the cruising regime). Such low aerodynamic loading of tailplane (58) is allowing for design of a gentle and light tailplane airframe. The application of supercritical airfoils across the span of the integral airlifting surface of the TDMW aircraft is generating a significantly lower compression and wave drag when compared to tailess flying wing aircraft at high subsonic and transonic speed. Additionally, unlike the tailess flying wing aircraft, the aft position of the gravity center of the TDMW aircraft with a distinctly pronounced forward position of outer wings (42) and wing transition sections (52) with trailing edge flaps situated thereon as shown in FIG. 2A, as well as a very long distance of tailplane (58) from aircraft gravity center are allowing for a full deployment of trailing edge flaps, while having a symbolic, negative aerodynamic loading of tailplane (58), thereby providing for a significantly higher ride quality and flight safety of the TDMW aircraft during takeoff and landing when compared to tailess flying wing aircraft.

On the other hand, despite a very long mean aerodynamic chord of integral airlifting surface, a very long distance of tailplane (58) from aircraft gravity center is providing for a high longitudinal trim efficiency of the TDMW aircraft in cruising flight configurations, similarly as it is the case with classical concept aircraft.

The relative thickness of airfoils in the payload area where the internal height is driven by the requirements for passenger comfort and payload volume depends only on the length of airfoil chords, hence the longer airfoil chords the lower relative thickness of airfoils. The elongation of airfoil chords in the central payload area of tailess flying wing aircraft by extending the aircraft nose forward is shifting the neutral point and gravity center of aircraft in the same direction relatively to outer wings and the mean aerodynamic chord of the entire airlifting surface of tailess flying wing aircraft, thus additionally requiring a significant negative sweeping of outer wings, thereby considerably decreasing the overall efficiency of tailess flying wing aircraft in cruising speed configurations. The elongation of airfoil chords of the central section of tailess flying wing aircraft in aft direction by moving back the trailing edge is shifting the neutral point and gravity center of aircraft in the same direction relatively to outer wings, thus significantly decreasing already low level of pitch control of tailess flying wing aircraft, which requires the increase of the airfoil chords of outer wings, thereby both elongations additionally significantly increasing the wetted area and decreasing the overall efficiency of tailess flying wing aircraft. Therefore, even tailess flying wing jumbo jet aircraft require a relative thickness of airfoils in passenger area of at least between 12% and 15%. On the other hand, relatively short airfoil chords of the central section are reducing the length of passenger area, thus requiring a significant lateral expansion thereof towards outer wings where airfoil chords are significantly shorter. This is generating significant negative effects including additional increase of airfoil relative thickness of more than 17% in lateral passenger compartments, as well as a much worse ride quality therein due to lateral expansion.

Conversely, the elongation of airfoil chords in the payload area of TDMW aircraft, which is performed by shifting trailing tip (30) in aft direction is resulting with the shift of tailplane (58) in the same direction relatively to outer wings (42), outer wing transition sections (52), and the mean aerodynamic chord of integral airlifting surface. The aft elongation of the central section of main wing (22) and the shift of tailplane (58) in aft direction for the same distance are also causing a significant shift of the neutral point and gravity center of TDMW aircraft in the same direction relatively to outer wings (42), outer wing transition sections (52), and the mean aerodynamic chord of integral airlifting surface. However, tailplane (58) is shifted in aft direction more than the neutral point and gravity center, hence the distance between tailplane (58) and gravity center is increased. Therefore, except for a decrease of relative thickness of airfoils in payload area, the elongation of airfoil chords in the same area is causing a loop of positive effects as follows:

ability to utilize supercritical airfoils across the span of integral airlifting surface ability to deploy trailing edge flaps on outer wings (42) and wing transition sections (52) during takeoff and landing increased pitch maneuver in all flight regimes increased longitudinal trim efficiency in cruising speed configuration The proximity of aircraft gravity center to outer wings (42) in longitudinal direction is decreasing the role of outer wings (42) in pitch control, thus enabling the optimization of the aerodynamic surface area of outer wings (42) for lateral control only, which allows for a decrease of the wetted area of outer wings (42), thereby partially compensating for the increase of wetted area of the central section of main wing (22). A significant elongation of the airfoil chords in the payload area is resulting simultaneously with a decrease of airfoil thickness and therefore the profile drag of aircraft, as well as a significant elongation of passenger area, thereby decreasing the need for passenger area to be wide to accommodate a large number of passengers, hence resulting with a high ride quality, similarly as being the case with classical concept passenger aircraft. The optimal elongation of airfoil chords in the payload area of the TDMW aircraft that carries over 500 passengers is resulting with the maximum relative thickness of airfoils in the payload area between 7% and 8.5%, whereas the average relative thickness across the entire span being significantly lower when compared to the wings of classical concept aircraft with the same payload capacity. The wetted area of TDMW aircraft that includes the wetted area of tailplane (58) and fin with rudder (68) is larger by no more than 10% when compared to the total wetted area of the tailess flying wing with a comparative payload capacity. Also, a detailed simulation showed that the efficiency of TDMW aircraft at high subsonic and transonic speeds over Mach 0.8 is more than twice higher when compared to tailess flying wing aircraft.

Tailplane (58) is having a simple trapezoidal planform. The geometric variables of tailplane (58), which are used for the aerodynamic optimization of TDMW aircraft are as follows:

chord lengths of tailplane root airfoil (64) and tip airfoil (66)

transversal distance between root airfoil (64) and tip airfoil (66)

sweep angle of tailplane leading edge (60)

longitudinal position of tailplane (58) relatively to fin with rudder (68)

The TDMW aircraft as shown in FIG. 1 is having two jet engines that are positioned laterally from the rear portion of main wing (22) aft of wing transition sections (52) and above the upper surface of integral airlifting surface. Jet engines are covered by aerodynamically shaped jet engine nacelles (76) with a smoothly shaped jet engine airintake. The vertical position of jet engines with jet engine nacelles (76) is adjusted to avoid the negative influence of the boundary layer and the turbulent airflow aft of the integral airlifting surface on jet engine airintake. Jet engines with jet engine nacelles (76) are attached to the top of the rear portion of jet engine pylons (74), which are aerodynamically shaped in airflow direction. Jet engine pylon (74) is a rear cantilever that is fastened to the airframe of the rear portion of the integral airlifting surface. Jet engine pylons (74) are extending aft of the trailing edge of integral airlifting surface. The front section of jet engine pylons (74) in front of the trailing edge of the integral airlifting surface is overlapping both the upper and under surface of the integral airlifting surface as shown in FIG. 1B, while the airframe of jet engine pylons (74) is fully integrated with the airframe of the integral airlifting surface in order to be able to successfully transfer inertia forces of jet engines into the main airframe of TDMW aircraft.

Jet engine pylons (74) with jet engine nacelles (76) are additionally acting as large vertical winglets on the lateral sides of the rear portion of main wing (22) as shown in FIGS. 1B and 1C, thus significantly reducing the vortex activity and induced drag, as well as preventing the lateral slip of airflow over a highly curved upper surface of the rear portion of main wing (22) and consequently increasing the aerodynamic efficiency of the rear portion of main wing (22). The lateral position of jet engine pylons (74) with jet engine nacelles (76) relatively to the rear portion of main wing (22) is adjusted to prevent the lateral slip of airflow over the upper surface of the rear portion of main wing (22), while simultaneously providing for the lowest possible increase of the compression drag over main wing upper surface (38) that is caused by the presence of jet engine pylons (74) and jet engine nacelles (76) at high subsonic and transonic speeds. The vertical position of jet engine pylons relatively to the integral airlifting surface, as well as the length and height of jet engine pylons (74) are adjusted to provide for the highest possible jet engine efficiency and the lowest possible induced and compression drag over the rear portion of main wing (22), while simultaneously jet engine pylons having the smallest possible wetted area and friction drag thereof.

Small airflow deflectors (80) are disposed over the upper surface on the lateral sides of the rear portion of main wing (22) aft of jet engine pylons (74) to minimize the lateral slip of airflow over the highly curved upper surface (38) of the rear portion of main wing (22) in order to increase the efficiency of the rear portion of the integral airlifting surface of TDMW aircraft that has a high forward sweep angle of main wing trailing edge (36) as shown in FIGS. 1A, 1B, and 1C. Lateral airflow deflectors (80) are also acting as small winglets, thus decreasing the local vortex activity around the rear portion of main wing (22) and consequently decreasing the induced drag over the rear portion of airlifting surface.

A successful application of deltoid main wing aerodynamic configurations for civil air transport requires a high aerodynamic efficiency and flight safety in all flight regimes, as well as a comfortable and safe accommodation of passengers including ability to dispose of cargo and luggage payload that allows for ability to be quickly loaded and unloaded. These additional requirements, as well as the necessity for a very rational distribution of the payload in vertical direction inside main wing (22), which needs to be defined with the thinnest possible airfoils, have resulted with a new, very rational, and practical payload arrangement with a staged passenger floor plan as shown in FIG. 2B.

FIG. 2A shows the layout for a typical payload and fuel distribution of deltoid main wing aircraft. Unlike tailess flying wing aircraft, the passenger area of deltoid main wing aircraft is distinctly longitudinally oriented, similarly as it is the case with classical concept aircraft. The length of the area for passenger accommodation is approximately the same as the one of the classical concept aircraft with the same overall length and span, while the width of the passenger area of deltoid main wing aircraft is twice as wide when compared to classical concept aircraft. Therefore, a single deck deltoid main wing aircraft is having approximately the same passenger capacity as a double-deck classical passenger aircraft with approximately the same external dimensions including length and span. The passenger area of deltoid main wing aircraft as shown in FIG. 2 is arranged with seven passenger compartments including one in the front, two central, two lateral, and two rear compartments. The embarkation and disembarkation of passengers may be performed simultaneously through the left and right front main passenger doors. There are 14 emergency exists including four in the front, six lateral, and four in the rear.

The passenger compartment in the front is reserved for the first class passenger accommodation, as well as for a communication that enables an easy access to central and lateral compartments. The left and right central compartments can be arranged partially or completely for the business class passenger accommodation. Each central and lateral compartment is having a single longitudinally oriented aisle. A large number of lavatories are located behind lateral and central compartments, as well as in the front of rear compartments. There is a rear transversal aisle between the lavatories to enable the access thereto, while simultaneously connecting the left and right section of the rear passenger compartment. A small number of lavatories can be disposed in the front of central compartments and in the front compartment. Each rear compartment is having one longitudinally oriented aisle for the access to rear emergency exits. A large number of auxiliary folded seats for crew members are disposed in front and rear compartments, while galleys being positioned laterally thereof. Two large lateral luggage compartments are located outboard of lateral passenger compartments. The space for the main gear disposal is located aft of lateral luggage compartments outboard of lateral passenger compartments. Lateral luggage compartments and the space for the main landing gear are separating passenger compartments from the main fuel tanks. The smaller fuel tanks that are located in the rear portion of aircraft at a large distance from the gravity center are used to keep the optimal position of gravity center in the cruising speed configuration.

Figure 2B:
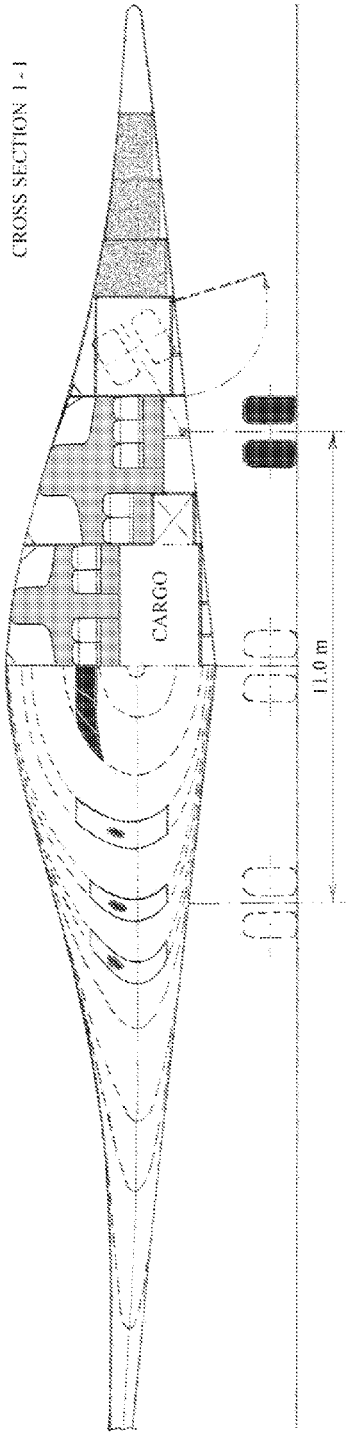

The right side of FIG. 2B shows a typical cross section of the aircraft in the area of central and lateral passenger compartments. The goal to have the lowest relative thickness of airfoils across the span of payload area resulted in turn with a significant decrease in the height of lateral compartments due to deltoid shape of main wing planform. The decrease in the height of the payload area is done in the optimal way via a cylindrically curved upper surface (38) in lateral direction, as well as by upwardly inclined flat under surface (40). A quasi-cylindrical shape of upper surface (38) of main wing (22) with a significant curvature in lateral direction is allowing for a light airframe in the pressurized area, while flat under surface (40) is suitable for inexpensive mass production. A significant decrease in the height of lateral passenger compartments due to a significant decrease of airfoil chords of main wing (22), as well as a decrease in height of the front and rear passenger compartments due to decrease of airfoil thickness in the nose and rear sections is requiring a staged passenger floor plan in order to optimize passenger and payload accommodation. Therefore, the floor plan in the front, lateral, and rear passenger compartments is set at the lower vertical level relatively to the central passenger compartments. Such vertical level differential of the passenger floor plan is done in order to result with approximately the same height in the aisles of all passenger compartments (2.3 to 2.55 m) including central passenger compartments. A higher vertical floor level of the central passenger compartments provides for a large space underneath for the cargo compartment with the height of up to 1.8 m. The access to the higher level of central passenger compartments is made possible by aisles that are slanted at approximately 10 degree angle from the front passenger compartment and via a stairway from the rear passenger compartment. The cargo compartment is a uniformed area that extends along the entire length of the central passenger compartments in longitudinal direction. The loading and unloading of cargo payload is done via a rear ramp. The passenger area floor under inboard seats of lateral passenger compartments may be set at a slightly higher level that is elevated by one step size (up to 0.2 m) in order to provide for some additional space for inner auxiliary luggage compartments with the height of 0.9 m. The access to the inner auxiliary luggage compartment is provided from the cargo compartment. The unloading and loading of lateral luggage compartments can be done by a movable airport ramp through the front lateral luggage doors or through the rear luggage doors. Carry-on luggage compartments are disposed above passenger seats in the same manner as it is the case with classical concept aircraft. These compartments are integrated with the airframe of main wing (22) as a longitudinal airframe reinforcement. Daylight for all passenger compartments is provided via a small number of skylights positioned above aisles with a high level of light dispersion. The left side of FIG. 2B shows a partial front view of the integral airlifting surface of deltoid main wing aircraft. It shows the cockpit position, main passenger door, and front emergency exits.

The above described payload arrangement of deltoid main wing aircraft is providing for a very efficient embarkation and disembarkation of a large number of passengers, as well as a quick loading and unloading of cargo and luggage payload for a large jumbo jet aircraft. Also, it is providing for a high passenger comfort with more intimate compartments, as well as a significantly larger cargo and luggage disposal space when compared to classical concept aircraft with the same passenger capacity. On the other hand, a favorably curved upper surface in pressurized passenger area, a favorable shape of all airframe surfaces in the payload area that are suitable for the inexpensive application of advanced composite materials are providing for a significantly lower airframe weight when compared with classical concept aircraft. A significantly lower weight and smaller wetted area, as well as a significantly larger airlifting area of deltoid main wing aircraft when compared to classical concept aircraft are providing for a significantly higher aerodynamic efficiency of deltoid main wing aircraft, thus TDMW aerodynamic configuration being very competitive for future mass passenger and cargo transportation.

A TDMW aircraft as shown in FIG. 2 that is scaled in size to fit within 80 m box at class VI airports has approximately the same payload capacity as the largest passenger classical concept aircraft A-380. Table T-1 shows comparative specifications between the TDMW aircraft as shown in FIG. 2 and A-380 aircraft. Data comparisons between TDMW aircraft as shown in FIG. 2 and A-380 from table T-1 shows that the TDMW aircraft is having approximately the same external dimensions (6.3 m shorter span, while having increased length by 6.0 m), wider passenger cabin by 88%, larger airlifting area by 32.5%, smaller wetted area by 27%, lighter operating weight empty by 42%, lighter maximal takeoff weight by 34.5%, smaller wing loading by 50.6%, and larger cargo and luggage space by 225% when compared to A-380 aircraft.

TABLE T-1

Comparison Between TDMW and A-380 Aircraft

| CATEGORY | TDMW | A-380 |
|---|---|---|
| POWER PLANT | | |
| Jet Engines [kN] | 2 × 374 | 4 × 374 |
| DIMENSIONS - EXTERNAL | | |
| Span [m] | 73.5 | 79.8 |
| Overall Length [m] | 79 | 73 |
| Height [m] | 11.9 | 24.1 |
| Wheel Track [m] | 11 | 14.3 |
| Wheel Base [m] | 22 | 30.4 |
| DIMENSIONS - INTERNAL | | |
| Passenger Cabin Length [m] | 42 | 32 |
| (Cabin Width)max [m] | 12.4 | 6.58 |
| Cabin Height [m] | 2.3-2.55 | 2.55 |
| Cargo & Luggage Vol. [m$^3$] | 252 | 171 |
| Additional Luggage Vol. [m$^3$] | 133 | — |
| PASSENGER CAPACITY | | |
| Seating (max) | 860 | 840 |
| Seating (Typical) total | 556 | 555 |
| 1st Class Seats | 12 (Front Comp.) | 22 |
| Business Class Seats | 168 (Central Comp.) | 96 |
| Economy Class Seats | 382 (Lateral Rear Camp.) | 437 |
| AREAS | | |
| Wings [m$^2$] | 1120 | 845 |
| Tailplane [m$^2$] | 226.8 | 200 |
| Fin With Rudder [m$^2$] | 80 | 127 |
| Wetted Area Total [m$^2$] | ~3620 | ~4960 |
| λ | 4.82 | 7.536 |
| WEIGHTS | | |
| Operating Weight Empty [kg] | ~160,000 | 276,800 |
| Typical Payload [kg] | 66,400 | 66,400 |
| Max. Fuel Capacity [kg] | 260,000 | 310,000 |
| Fuel Weight Typical [kg] | 140,000 | 216,800 |
| Takeoff Weight Gross, Max. [kg] | 366,500 | 560,000 |
| Landing Weight, Max. [kg] | 270,000 | 386,000 |
| Wing Loading, Max [kg/m$^2$] | 327 | 663 |

The estimated operating weight empty of deltoid main wing aircraft as shown in FIG. 2 of 160,000 kg is obtained by rough calculations while using the following estimates and approximations:

The weight of the external surface area of flying wing aircraft participates in general with more than 70% of the total airframe weight.

Over 80% of deltoid main wing airframe was made of advanced composite materials that are more than twice lighter than aluminum alloys.

The wall thickness of the external surface area of deltoid main wing aircraft is lower by at least 25% when compared to classical concept aircraft due to almost ideal mutual distribution of aerodynamic and inertia forces of payload, fuel, and airframe except for a relatively small rear section of main wing (22) to which T-tail is fastened.

The fuel weight of 140,000 kg was obtained by using the following calculation path.

The initial cruising conditions with speed of M0.85, cruise ceiling of 9,000 m, and the aircraft weight that is close to the maximal takeoff weight require the wings of A-380 to generate the average lift coefficient of $C_L$=0.428, while under the same conditions the integral airlifting surface of TDMW would have to generate the average lift coefficient of $C_L=0.2113$, which is twice as low. Under the conditions set above, the passenger floor would have to be at zero degree angle, which is the same angle during the take-off on the runway.

The takeoff conditions that are defined with the maximum takeoff weight as outlined in table T-1, as well as the limited takeoff speed of 340 km/h for both aircraft would require the average lift coefficient of the airlifting surface of A-380 aircraft to be $C_L=1.175$, while $C_L$ being only 0.58 for TDMW aircraft. The required lift coefficient $C_L$ during takeoff of A-380 aircraft assumes a deployment of trailing edge flaps and leading edge slats across the entire wing span. Trailing edge flaps of the TDMW aircraft are covering only the outboard section of integral airlifting surface that equals 450 m². The rest of the integral airlifting surface of 670 m² during take-off can produce only $C_L=0.2113$. Because of that, the outboard section with trailing edge flaps and leading edge slats has to produce the increased lift coefficient of $C_L=1.129$, which is very close and even a little lower when compared to the one of A-380, thus justifying the reality of assumed initial takeoff weight with the fuel weight of 140,000 kg of the TDMW aircraft from the aspect of take-off requirements.

Other than the takeoff speed, the runway length during takeoff depends on the value of average acceleration of aircraft during the takeoff. The acceleration of aircraft depends on the jet engine thrust, as well as the overall aircraft mass and drag. Aircraft A-380 is having twice higher engine thrust when compared to TDMW aircraft though 52% higher aircraft mass that generates two negative effects including a higher aircraft inertia and higher friction drag of landing gear. Also, A-380 is having 87% larger airlifting area when means for extra lift production are deployed, which generates a higher profile drag, as well as 37% higher overall wetted area and consequently higher total aerodynamic friction drag. Therefore, despite twice lower engine trust, the average acceleration of the TDMW aircraft would be very close to the acceleration of A-380. Additionally, TDMW aircraft is having a significantly higher ground effect than A-380 due to a significantly longer airfoil chord and a shorter distance from the ground, thereby the actual takeoff speed would be significantly lower than the one of A-380. All of the above would provide for a shorter takeoff runway of the TDMW aircraft despite twice lower engine trust when compared to A-380.

A rough aerodynamic analysis of cruising conditions for both aircraft by using data from T-1 table is resulting with the following conclusions:

During the initial cruise conditions with the cruising speed of Mach 0.85 at the altitude of 9,000 meters when the aircraft weight is very close to take-off gross max. weight, the horizontal flight profile of A-380 aircraft requires the average lift coefficient of wings to be $C_{LW}=0.4179$, while the TDMW aircraft as shown in FIG. 2 requires the average lift coefficient of integral airlifting surface to be $C_{Lias}=0.2063$. The experimental aerodynamic testing of efficient classical airfoils with the relative thickness of 9% and lift coefficient $C_L=0.2063$ showed that drag coefficient is increased by about 85% when lift coefficient is increased from $C_L=0.2063$ to $C_L=0.4179$ at the speed of M0.85. For airfoils with the relative thickness of 6%, drag increase would be a little lower for the same change of lift coefficient (76%) at the same speed of M0.85. Based on this, for the same relative thickness of airfoils for both aircraft of 7.5% on average, the total profile wing drag of A-380 would be higher by 39% when compared to the integral airlifting surface of TDMW aircraft as shown in FIG. 2 despite 25% smaller wetted area of wings of A-380 aircraft due to required higher lift coefficient of A-380. The average relative thickness of wing airfoils of A-380 is about 8.2%, while the average relative thickness of airfoils of integral airlifting surface of the TDMW aircraft as shown in FIG. 2 is 7% due to twice lower loading of the airlifting surface of the TDMW aircraft and almost ideal mutual disposition of aerodynamic and inertia forces thereof when compared to A-380 classical concept aircraft. Such difference in the relative thickness and required lift coefficient is resulting with the higher total profile drag of A-380 wings by approximately 89% when compared to the total profile drag of the integral airlifting surface of TDMW aircraft. On the other hand, the twice higher lift coefficient of A-380 wings despite 25% lower airlifting area and 55% higher wing aspect ratio is generating 72% higher induced drag when compared to the integral airlifting surface of TDMW aircraft, hence TDMW's induced drag coefficient being additionally increased for calculation purposes by 15% due to less favorable shape of the rear portion of TDMW aircraft. This is resulting with the higher total drag of A-380 wings by 86% when compared to the total drag of TDMW integral airlifting surface (induced drag at the speed of M0.85 is participating under 15% of the total drag of the airlifting surface that is defined with efficient classical airfoils, hence 89%×0.85+72%×0.15=86%).

In addition to the wings, classical concept aircraft A-380 has a very large fuselage where payload is disposed, while a similar area being smoothly integrated into the airlifting surface of TDMW aircraft. The fuselage of A-380 aircraft has an elliptical shape whose cross-section is having the width of 7.142 m and height 8.410 m, while the referenced length of the fuselage is 69 m, hence resulting with the wetted area of the fuselage representing 87% of the wings' wetted area. A very large cross-section and length of the fuselage are generating a very thick turbulent boundary layer, hence producing a significant friction drag that is participating in total aircraft drag with at least 15%. The surface area of tailplane and fin with rudder of A-380 aircraft is larger by 6.5% when compared to tailplane (58) and fin with rudder (68) of the TDMW aircraft though the interference drag between tailplane (58) and fin with rudder (68) of TDMW aircraft is higher than the same of A-380, hence the total tail drag of both aircraft is taken as being approximately the same for calculation purposes.

It is further assumed that the integral airlifting surface drag of TDMW aircraft is participating in the total drag with 85%, while T-tail participating with 15%, whereas the wings of A-380 aircraft are participating with 77%, fuselage 15%, and tailplane 8%, which is quite close to reality. In that case, the total aircraft drag of A-380 aircraft would be higher by 105% when compared to the TDMW aircraft in cruising conditions at M0.85, thereby resulting in reduction of fuel consumption per unit of payload of the TDMW aircraft by more than twice relatively to A-380 aircraft. This further confirms the reality of the initial assumption of having the power plant of the TDMW aircraft twice smaller than the one of A-380 aircraft for both take-off and cruising conditions.

Additionally, a lower relative thickness of airfoils and a significantly lower required lift coefficient would provide for a significantly higher economical cruising speed of the TDMW aircraft when compared to A-380 aircraft, thereby significantly shortening the flight duration for long distance intercontinental flight routes.

Figure 3A:
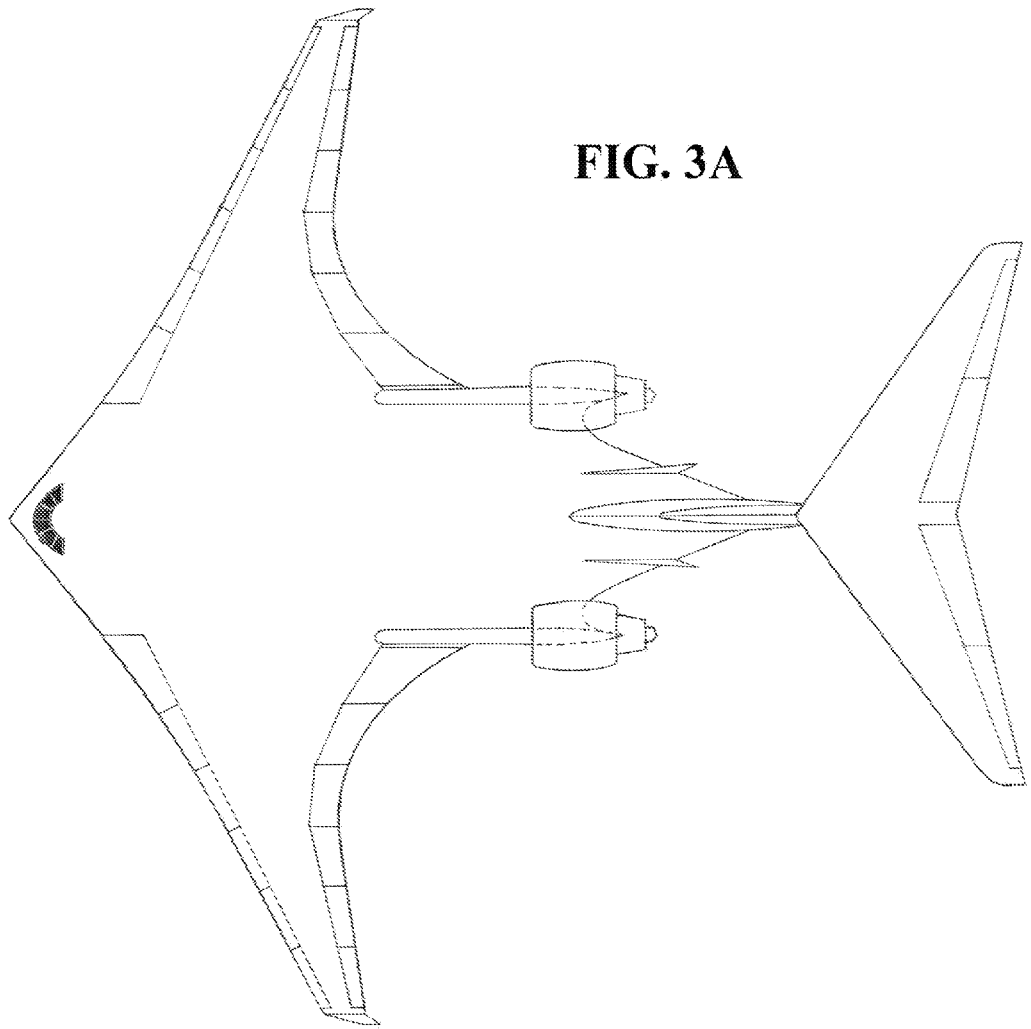
FIG. 3 shows an aerodynamically optimized passenger aircraft based on the TDMW aerodynamic configuration that is sized to fit within 80 m box on class VI airports with the capacity of 680 passengers in a 3-class arrangement, while having over 960 passengers in a single economy class arrangement.
Figure 3B:
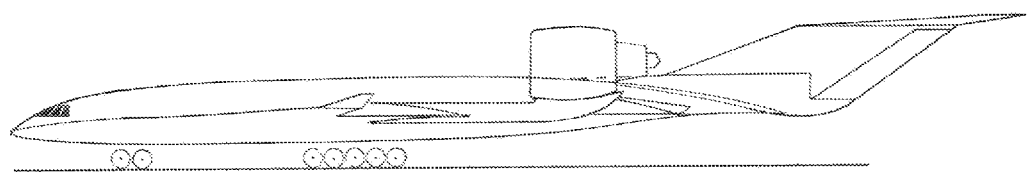

FIG. 3 shows a TDMW aircraft that is optimized as a high-capacity passenger aircraft. The span and overall length of such aircraft are approximately the same. The TDMW aircraft as shown in FIG. 3 when sized to fit within 80 m box on Class VI airports would have a capacity of 680 passengers accommodated in a 3-class arrangement (444 in economy class, 216 in business class, and 20 in the first class), which represents a total of additional 125 passengers or 22.5% more when compared to A-380 aircraft. The maximum capacity of this aircraft in a single economy class would be over 960 passengers.

The TDMW aircraft as shown in FIG. 3 when compared to the TDMW aircraft as shown in FIG. 2 is having a 6.5 m wider span, only 1.0 m increased overall length, 1.8 m shorter longitudinal diagonal (24), 9 degree lower sweepback angle of main wing leading edge (34), 5.7 degree lower forward sweep angle of main wing trailing edge (36), 382 m² or 34% larger airlifting surface area, 101.7 m² or 44.8% larger tailplane's aerodynamic surface area, as well as a significantly shifted longitudinal position of outer wings (42) and wing transition sections (52) in fore direction relatively to main wing (22) and tailplane (58).

A lower sweepback angle of main wing leading edge (34) and forward sweep angle of main wing trailing edge (36) are providing for the enlargement of passenger cabin width by 2.4 m so that the airfoil chord at the lateral end of the passenger area is longer by 2.5 m when compared to the aircraft as shown in FIG. 2, thus allowing for the increase of passenger capacity within main wing (22), while the average relative thickness of airfoils in the passenger area being lower despite higher relative thickness of the airfoil in the symmetry plane due to shorter longitudinal diagonal length.

A significant increase of the integral airlifting surface area and the tailplane's aerodynamic surface area are increasing the friction drag of aircraft that is shown in FIG. 3. However, the aerodynamic loading of the integral airlifting surface is lower due to the increase of the surface area thereof, thus decreasing the profile drag of aircraft that is shown in FIG. 3 despite the increase of total aircraft weight. Furthermore, a significantly shifted longitudinal position of outer wings (42) and wing transition sections (52) relatively to main wing (22) are significantly shifting the mean aerodynamic chord of the integral airlifting surface in fore direction, while simultaneously the significant increase of the tailplane's aerodynamic surface area is drastically shifting the neutral point and gravity center in aft direction along the mean aerodynamic chord of the integral airlifting surface of aircraft that is shown in FIG. 3, thus for the same static margin level, the above is providing for a significant increase of the utilization of supercritical airfoils across the span of integral airlifting surface with a lower negative lift coefficient of the tailplane in cruising speed conditions when compared to the aircraft as shown in FIG. 2, thereby significantly decreasing the profile drag of aircraft as shown in FIG. 3. All of the above is providing for a significant decrease in fuel consumption per unit of payload and a higher economical cruising speed of aircraft as shown in FIG. 3 relatively to the aircraft as shown in FIG. 2 due to a significantly higher passenger capacity and higher level of supercritical airfoil utilization of aircraft as shown in FIG. 3.

FIGS. 4, 5, 6, and 7 show aircraft that are based on Finless Tailed Deltoid Main Wing aerodynamic configuration (FTDMW). This aerodynamic configuration is based on the general idea of "Deltoid Main Wing", which is similar to the TDMW aerodynamic configuration as shown in FIGS. 1, 2, and 3. The main differences between FTDMW and TDMW aerodynamic configurations are as follows:
 A different number and shape of jet engine nacelles
 A different position of jet engine nacelles relatively to deltoid main wing
 A different connection of jet engines with jet engine nacelle and deltoid main wing
 A different position and connection of the tailplane relatively to deltoid main wing
 The absence of fin with rudder of FTDMW aerodynamic configuration Jet engines of the aircraft based on the FTDMW aerodynamic configuration are located in integral jet engine nacelle (82) that is fully aerodynamically and structurally integrated with the rear portion of main wing (22). Integral jet engine nacelle (82) is symmetrically disposed over deltoid main wing upper surface (38) on both sides of the aircraft symmetry plane. Integral jet engine nacelle (82) is overlapping main wing trailing edge (36) in lateral direction and trailing tip (30) in aft direction. The front edge of integral jet engine nacelle (82) is an aerodynamically shaped lip of airintake. Main wing upper surface (38) and the aerodynamic lip of integral jet engine nacelle (82) form the jet engine air intake. The inner space of integral jet engine nacelle (82) along its entire length is divided by a central partition into symmetrical inner sections if two engines are disposed therein. The central partition of integral jet engine nacelle (82) in front of jet engine is aerodynamically shaped to minimize the turbulence and energy loss inside jet engine airintake. On the other hand, the central partition of jet engine nacelle (82) is designed as the airframe reinforcement along the entire length of integral jet engine nacelle (82) in order to provide for a successful transfer of all forces from the central jet engine nacelle airframe into deltoid main wing airframe. The airframe of jet engine nacelle (82) is fully integrated with the airframe of the rear portion of main wing (22) into a single airframe.

Tailplane (58) of the FTDMW aircraft is made of two symmetrical sections that are joined integral jet engine nacelle (82) on the bottom of both lateral sides of integral jet engine nacelle (82) as low mounted cantilever. Tailplane (58) of the FTDMW aircraft is having leading edge strake (84). Leading edge strake (84) starts from the point where the lip of integral jet engines nacelle (82) meets main wing trailing edge (36), thus acting as a following winglet that is reducing the vortex activity around main wing trailing edge (36) in front of integral jet engine nacelle (82). Tailplane trailing edge (62) of FTDMW aircraft is overlapping integral jet engine nacelle (82) in all direction in order to shift the neutral point and gravity center of aircraft in the same direction and increase the level of supercritical airfoil utilization across the span of integral airlifting surface. A pivotal central pitch control section (86) that is placed between the left and right section of tailplane (58) aft of integral jet engine nacelle (82) is joined the rear bottom section thereof. The upper surface of pivotal central pitch control section (86) has to be protected from hot engine jets and shaped in such way to minimize the jet pulsation behind integral jet engine nacelle (82). The lower surface of pivotal central pitch control section (86), the lower surface of integral jet engines nacelle (82), and the rear portion of deltoid main wing under surface (40) are smoothly blended together into a rectangular extension of main wing under surface (40), hence the trailing edge of pivotal central pitch control section (86) being the trailing edge of the central section of main wing under surface (40). The under surface of tailplane (58) is also smoothly blended with the extended central portion of main wing under surface (40) on both lateral ends thereof, thus providing for a stable airflow conditions without vortices over the central rear portion of main wing under surface (40). Pivotal central pitch control section (86) can be used for both pitch trimming and pitch maneuver. A deflection of the trailing edge of pivotal central pitch control section (86) in downward direction increases the positive aft camber of main wing under surface (40), thus shifting the center of air pressure over the central section of main wing under surface (40) in aft direction, thereby generating a negative pitch momentum. A deflection of the trailing edge of pivotal central pitch control section (86) in upward direction is simultaneously producing two effects including the increase of negative aft camber of the rectangular extension of main wing under surface (40) and a deflection of engine jets in upward direction, thereby simultaneously generating a positive pitch momentum. Pivotal central pitch control section (86) is simultaneously being used together with the elevator of tailplane (58) for both pitch trim and pitch maneuver. The contribution of pivotal central pitch control section (86) is very powerful and important during low-speed, nose-up maneuvers. A very long distance of jet engines and pivotal central pitch control section (86) from aircraft gravity center is providing for a high pitch momentum (nose-up) by deflecting upwardly jet engine flow at low speed when the efficiency of tailplane maneuvering surfaces is low, thus significantly increasing the flight safety of aircraft at low speed. The additional positive side effects generated by the low position of pivotal central pitch control section (86) aft of integral jet engine nacelle (82) are related to a significant noise reduction in the vicinity of airports, as well as a significant decrease of infra red reflection for military aircraft.

Deltoid main wing upper surface (38) is discontinued by integral central jet engine nacelle (82), whereby the left and right sections of the rear portion of main wing upper surface (38) immediately in front of integral jet engine nacelle (82) are deformed in a way that their convexity is gradually decreased, while the convexity of the left and right sections of the rear portion of main wing upper surface (38) next to jet engine airintake is transformed into a concavity in order to form two quasi-elliptical jet engine airintakes together with the lip of jet engine nacelle (82) as shown in FIG. 5C. The bulge on the rear portion of main wing upper surface (38), which is formed in the symmetry plane is starting to gradually raise up right in front of jet engine air intake in order to strengthen the bending momentum resistance of the rear portion of main wing (22) as shown in FIGS. 5B and 5C, thus enabling a successful transfer of all loads from the jet engine nacelle airframe into the main wing airframe. The above described metamorphosis of the shape of main wing upper surface (38) in front of jet engine air intake is providing for both a higher efficiency of the central section of airlifting surface due to increase of aft camber of main wing upper surface (38) and a higher efficiency of jet engines due to increase of jet engine airintake area, as well as a more favorable shape of two quasi-elliptical airintakes as shown in FIG. 5C. The activity of jet engine compressors generates an air depression in front of jet engine air intakes, thus additionally increasing the energy of airflow and decreasing the thickness of the boundary layer over upper surface (38), thereby significantly additionally increasing the aerodynamic efficiency of the airlifting surface of FTDMW aircraft. However, on the other hand, the presence of upper surface (38) in front of jet engine airintake requires the increased effort by jet engine compressors, thus causing a decrease of jet engine efficiency. The increased height of jet engine nacelle airintakes would allow for more free and unobstructed airflow to be sucked in, hence increasing jet engine efficiency though it would decrease the airflow depression in front of the airintake and decrease the aerodynamic efficiency of the airlifting surface. Also, the increased height of integral jet engine nacelle (82) would increase the wetted area and friction drag, as well as the lateral aerodynamic reflection, while decreasing yaw control of FTDMW aircraft. The height of integral jet engine nacelle (82) should be optimized to achieve the highest possible overall efficiency of aircraft. The yaw maneuver and directional control of FTDMW aircraft is controlled by drag rudders that are attached to winglets, which is the main reason for much higher winglets of FTDMW aircraft when compared to the same of TDMW aircraft. Simultaneously, the higher winglets are providing for a lower induced drag on outer wings (42) of FTDMW aircraft.

Above described different design solutions for FTDMW aerodynamic configuration relatively to TDMW aerodynamic configuration are resulting with different aerodynamic features and performance. The aerodynamic advantages of FTDMW aerodynamic concept relatively to TDMW aerodynamic concept with fin and rudder are as follows:

- Smaller total wetted area of aircraft due to absence of fin with rudder and jet engine pylons, as well as the integration of jet engine nacelles (76) into one integral jet engine nacelle (82), which is additionally integrated with the rear portion of main wing (22).
- Lower interference drag of aircraft due to absence of aerodynamically unfavorable perpendicular connection of fin with rudder (68) with main wing (22) and tailplane (58), as well as jet engine pylons (74) with main wing (22) and jet engine nacelles (76).
- Lower lateral and visual reflection of aircraft due to the absence of a large vertical surface area of fin with rudder (68), which is important for military applications.
- Pivotal central pitch control section (88) deflects jet engine noise in upward direction, thereby significantly reducing the level of noise around airports.
- Pivotal central pitch control section (88) is significantly increasing the pitch momentum of FTDMW aircraft, especially at low speed, thus providing for a higher flight safety.
- FTDMW aircraft is shorter, more compact with a higher pitch momentum, hence providing for a significantly higher level of pitch maneuverability, thus being much more favorable for military applications when compared to the TDMW aircraft.
- Significantly elongated main wing under surface (40) and the presence of jet engine airintake aft of main wing upper surface (38) of the FTDMW aircraft are allowing for a better aerodynamic optimization of the central section of main wing (22) with thicker airfoils to allow for payload disposal, which is why the FTDMW configuration is more favorable for smaller aircraft with bulky payload.

The aerodynamic disadvantages of the FTDMW aerodynamic configuration relatively to the TDMW aerodynamic configuration are as follows:

- A significantly lower directional control and yaw maneuver of aircraft, especially at low speeds due to the absence of fin with rudder at a long distance from aircraft gravity center.
- Lower jet engine efficiency due to negative influence of turbulent boundary layer over main wing upper surface (38) in front of jet engine airintake, thereby consequently resulting with thrust loss.
- Inability to use supercritical airfoils across the central section of main wing (22) in front of jet engine airintake, thus resulting with a significantly lower aerodynamic efficiency of the large central section of main wing (22) and consequently together with lower jet engine efficiency resulting with the lower overall efficiency of the finless version, especially at higher subsonic and transonic speed (over M0.85).
- Relatively complex aerodynamic shape of the airframe of integral jet engine nacelle (82) and the rear portion of main wing (22) in front of jet engine airintake is increasing the production cost of FTDMW aircraft.

FIG. 5 shows an FTDMW passenger aircraft that is optimized for the 230-300 passenger capacity in different seating arrangements with the following external dimensions:

Span b=52.5 m

Overall length L=51 m

Overall Height H=6.2 m

Airlifting surface area in front of jet engine nacelle Aa.s.=659 m$^2$.

Aa.s.total=722 m$^2$ (additionally including the planform area of integral jet engine nacelle (82) with pivotal central pitch control section (86))

Tailplane surface area At.p.=134.3 m$^2$

Total wetted area Awatot=2010 m$^2$

The passenger area is arranged with a single floor level without the cargo disposal underneath, which is typical for smaller DMW aircraft. The passenger compartment width of 10.2 m is allowing for a seating arrangement of 3+4+4+3 combination or 14 seats across with one central and two lateral aisles. This one-class arrangement with seat width of 0.6 m and seat pitch of 0.76 m is providing for a capacity of 300 passengers. If the central seats are arranged as a first class with seat width of 0.8 m and seat pitch of 0.96 m, it would be possible to accommodate 90 passengers in the first class and 140 passengers in the economy class for a total of 230 passengers. The luggage compartments are located laterally from the passenger compartment. The relative thickness of airfoils in the payload area does not exceed 9.5%, while it is gradually decreasing down to under 7% at the outer wing tip. Such distribution of relative thickness is providing for the internal height in aisle area from 2.15 to 2.55 m, as well as a very large space for fuel disposal laterally from luggage compartments.

When compared to the latest Boeing's Dreamliner B787-9 aircraft, the FTDMW aircraft as shown in FIG. 5 is having a 6.3 m shorter span, 11 m shorter overall length, 10 m lower height, more than twice larger airlifting surface area, approximately 7% larger total wetted area, approximately the same passenger capacity, up to 50% more space for fuel disposal, and about 40% lighter airframe due to a significantly higher percentage of composite material utilization and more favorable distribution of aerodynamic and inertia forces.

A rough aerodynamic analysis shows that the FTDMW aircraft as shown in FIG. 5, despite a lower jet engine efficiency and slightly higher total wetted area would have a higher aerodynamic efficiency and a lower fuel consumption per unit of payload of at least 30% even with 20% higher fuel capacity when compared to B787-9 aircraft due to more than twice larger airlifting area, significantly lighter weight-empty aircraft, as well as a significantly lower interference drag. On the other hand, over 30% lower fuel consumption and over 20% higher fuel capacity of FTDMW aircraft would provide for a significantly longer range of the FTDMW aircraft as shown in FIG. 5 when compared to B787-9 aircraft with no increase in fuel consumption per unit of payload.

FIG. 6 shows an aircraft based on FTDMW aerodynamic configuration. This specifically designed aircraft is optimized to reach the highest possible airlifting capacity with the smallest possible wetted area and outer dimensions, while simultaneously providing for a sufficient and safe flight controls in all flight regimes. The highest lift capacity with the smallest wetted area and outer dimensions of aircraft can be reached only if all aerodynamic surfaces of aircraft as shown in FIG. 6 including tailplane (58) produce lift with the same lift coefficient in cruising speed configurations. In that case, FTDMW aerodynamic configuration would be transformed into a "Longitudinal Double Wing" (LDW) aerodynamic configuration, which is based on a "front wing" that is consisted of main wing (22) in front of jet engine airintake, wing transition sections (52), and outer wings (42), as well as a "rear wing" that is consisted of tailplane (58) and integral jet engine nacelle (82) with pivotal central pitch control section (86). The involvement of rear wings in positive lift production during the stationary flight regime of the aircraft is possible only if the air pressure center of the front wing is located in front of aircraft gravity center. The longitudinal position of the front wing air pressure center relatively to the aircraft gravity center depends on the longitudinal position of aircraft gravity center along the mean geometric chord of the front wing and the longitudinal position of the local air pressure center along the local airfoil chord. The longitudinal position of the local air pressure center along the local airfoil chord depends on airfoil geometry. Generally, airfoils with the aft camber are having a higher aerodynamic efficiency and the air pressure center that is shifted in aft direction, which is favorable for aircraft efficiency though being unfavorable for a higher involvement of the rear wing in positive lift production. Therefore, the aerodynamic optimization of the front wing of the aircraft as shown in FIG. 6 is headed in the direction of shifting the mean geometric chord of the front wing in fore direction relatively to the aircraft gravity center, thus allowing for a higher level of efficient airfoil utilization across the span of the front wing. The most efficient way to shift the mean geometric chord of the front wing in fore direction relatively to the aircraft gravity center is by shifting the root airfoil chord of outer wings (42) in fore direction relatively to transversal diagonal lateral tips (32), while simultaneously decreasing the sweepback angle of outer wings leading edge (44), as well as decreasing the difference between sweepback angles of outer wings leading edge (44) and outer wings trailing edge (46). Also, the longitudinal diagonal (24) of main wing (22) has to be shortened in order to decrease the distance between integral jet engine nacelle (82) together with the sections of tailplane (58) and aircraft gravity center, which requires a higher positive lift coefficient of the rear wings for the same positive pitch momentum of the front wing. The leading and trailing edge of wing transition sections (52) has to be adjusted to shift the mean geometric chord thereof in fore direction as much as possible. The aspect ratio and span of tailplane (58) need to be increased in order to decrease the induced drag over the rear wing and improve the roll control of LDW aircraft as shown in FIG. 6. The sweepback angles of the sections of tailplane (58) are decreased in order to shift the mean geometric chord of rear wings in fore direction towards the aircraft gravity center. The longitudinal position of the gravity center of aircraft is shifted in aft direction towards rear wings, which is increasing the positive pitch momentum of front wings and decreasing the distance between the gravity center and rear wings, thus requiring a higher positive lift on rear wings during stationary flight regime. The size of the aerodynamic surface area of tailplane (58) needs to be optimized to result with the optimal lift coefficient of rear wings, as well as the acceptable level of the longitudinal dynamic stability of the aircraft as show in FIG. 6.

The optimized planform composition (shape, size, and the mutual position of front and rear wings) as shown in FIG. 6 with irregular airfoils (without trailing edge) just in front of jet engine air intake and supercritical airfoils across the span of front wings outboard of jet engine intake, as well as with supercritical airfoils across the span of rear wings outboard of jet engine nacelles is providing for a lift production on rear wings with the positive lift coefficient that is 50% in size of the average lift coefficient of front wings in the cruising speed condition when aircraft gravity center is set at 0% static margin, while the value of the positive lift coefficient of rear wings is up to 70% of the average lift coefficient of front wings in the cruising speed condition when aircraft gravity center is set at −5% static margin. The above aerodynamic optimization is providing for a design of all-size and purpose, highly efficient, high-capacity, long-range, high-subsonic (up to M0.85), and low-dynamically stable unmanned aircraft due to very simple, efficient, and reliable flight controls of such aircraft in all three axis.

The aircraft as shown in FIG. 6 with added cockpit in front of front wing leading edge in symmetry plane is designed as a manned aircraft. Relatively short chords in payload area of such aircraft are limiting its application to payload with low height, tanker aircraft for in-flight refueling, as well as firefighting aircraft. The aircraft as shown in FIG. 6 that is defined with efficient classical airfoils across the span of front and rear wings with air pressure center located at up to 40% of local airfoil chords is generating a positive lift coefficient on rear wings in cruising speed configuration that is as high as 50% of the average lift coefficient of front wings when aircraft gravity center is set at +5% static margin, while providing for a positive lift coefficient of as high as 70% of average lift coefficient of front wings when aircraft gravity center is set at 0% static margin.

The aircraft as shown in FIG. 6 when configured as a tanker and scaled up in size to have 47.1 m span (17.65% shorter than KC-45) and 36.1 m overall length (43.4% shorter than KC-45) would have the airlifting surface area of 627.5 m² (73.5% larger than KC-45). Such aircraft would additionally have a lighter operating weight empty by at least 65% when compared to KC-45 due to a significantly smaller outer dimensions, airframe that is made almost completely of advanced composite materials, and significantly more favorable distribution of aerodynamic and inertia forces. The economical cruising speed of such aircraft would be up to M0.7 with the minimum air refueling speed of 250 mph. A significantly larger airlifting surface area and lighter airframe weight would provide for twice higher fuel off-loading capacity when compared to KC-35 (120 tons). The same air tanker aircraft is possible to be configured as a fire fighting aircraft on the production assembly line with less than 10% components and equipment to be modified for such purpose. This firefighting aircraft would carry at least 90-ton water bombs, which is higher than the biggest firefighting tanker "Evergreen" (B-747 adaptation) with the drop speed of less than 150 mph, while the drop height being between 400 and 600 ft. The production cost for these aircraft would be quite low due to their very simple airframe geometry (several times lower than the "Evergreen" aircraft).

FIG. 7 shows an FTDMW aircraft that is optimized for a military application (bomber and reconnaissance patrol). The basic difference between the military aircraft as shown in FIG. 7 and the passenger aircraft as shown in FIG. 5 both of which are designed for approximately the same payload and fuel capacity relates to different external dimensions of aircraft (span and length), as well as different maneuvering surfaces for pitch, roll, and yaw control (size, position, and functionality). The military aircraft as shown in FIG. 7 is having a shorter span and length when compared to the passenger aircraft as shown in FIG. 5, thus making the airframe of the military aircraft stronger including the smaller inertia momentum around all three axes in order to provide for a better aircraft maneuverability. Simultaneously, the smaller external dimensions are providing for a lower visual and radar reflection of the military aircraft as shown in FIG. 7.

However, the shorter span and length of the military aircraft would cause the reduction of roll and pitch momentum. Therefore, the chord lengths of outer wings (42) and tailplane (58) of the military version are longer when compared to the passenger version in order to increase the surface area of the maneuvering surfaces and provide for a higher pitch and roll maneuver. The increase of the roll maneuver of the military aircraft is possible to achieve by deploying an outboard elevator of tailplane (58), which has the role of the elevon for both pitch and roll maneuver. Pivotal central pitch control section (86) of the military aircraft version is longer than the one of the passenger aircraft, thus additionally increasing the maneuver of the military aircraft when compared to the passenger aircraft version. The longer pivotal central pitch control section (86) is additionally decreasing the infrared reflection and increasing the survival chances of the aircraft during military operations. The pitch maneuver of the military aircraft is additionally increased due to a lower longitudinal dynamic stability when compared to the passenger aircraft. The static margin of the military aircraft is allowed to be significantly lower when compared to civil aircraft in order to increase pitch maneuver. A large number of modern military aircraft are designed with negative static margin. The lower static margin also shifts the aircraft gravity center in aft direction, thus enabling a higher percentage of supercritical airfoil utilization on aircraft wings. Additionally, the lower static margin of FTDMW aircraft may involve a higher utilization of tailplane (58) in positive airlift production during the stationary flight. Therefore, the position of aircraft gravity center with a static margin of −5% for the military version as shown in FIG. 7 when irregular classical airfoils are used in front of integral jet engine nacelle (86), while supercritical airfoils are used for the outboard section laterally from integral jet engine nacelles (84) across the entire remaining aircraft span with air pressure center position being between 50% and 60% allow for the participation of tailplane (58) in aircraft lift production with a positive lift coefficient in cruising speed conditions that is 40% lower than the average lift coefficient of the integral airlifting surface. In this case, the military version of the aircraft as shown in FIG. 7 is functioning effectively as an LDW aircraft, thus increasing the payload and fuel capacity by at least 12% relative to the civil aircraft as shown in FIG. 5.

The military aircraft as shown in FIG. 7 has no winglets in order to reduce lateral aerodynamic, visual, and radar reflection, as well as to reduce inertia momentum around the longitudinal and vertical axes. The tips of outer wings (42) are slightly rolled up in order to reduce the induced drag of aircraft. The height of integral jet engine nacelle (82) of the military aircraft version as shown in FIG. 7 is lower than the one of the civil aircraft as shown in FIG. 5 in order to reduce the aerodynamic, visual, and radar lateral reflection. The configuration of the military aircraft as shown in FIG. 7 without winglets requires different solutions for directional control and yaw maneuver when compared to the civil aircraft as shown in FIG. 5. One such solution is to use split drag ailerons as it was the case with B-2. However, a higher lateral aerodynamic reflection of integral jet engine nacelles (82), which are positioned at a long distance aft of aircraft gravity center would not allow for a sufficient yaw maneuver of the aircraft in such case. Therefore, another solution would be applied as shown in FIG. 7 with short all-moving independent pivotal vertical rudder (88). Pivotal vertical rudder (88) is positioned on the top of the rear portion of integral jet engine nacelle (82) in the aircraft symmetry plane. The independent vertical rudder (88) is hidden in the shadow of large tailplane (58), hence it has a low lateral visual and radar reflection. A long distance of the independent vertical rudder (88) from the aircraft gravity center, as well as a high aerodynamic efficiency of its shape is providing for a high yaw momentum and consequently a high level of aircraft yaw maneuverability due to low lateral aerodynamic reflection of aircraft, as well as low inertia momentum relative to the vertical axis.

A high lift capability of the military aircraft as shown in FIG. 7, high aerodynamic efficiency of the aircraft and low fuel consumption per unit of payload, high economic cruising speed, as well as the top speed of aircraft of more than Mach 0.85, low level of visual, radar, and infra-red reflection, high service ceiling capability (over 25,000 m), a high level of aircraft maneuverability in all three axes, low minimal speed, and a high level of flight safety in all flight regimes make it possible to design a multi-role large military high-subsonic aircraft for the following purposes: long-range strategic high-subsonic bomber, high flight endurance military patrol aircraft, high fuel capacity in-flight refueling tanker aircraft, and high-flight-endurance reconnaissance aircraft. All of the above applications would have over 80% of the same components (basic airframe, systems, avionics, and equipment), hence significantly reducing the production and particularly the maintenance cost.

The following table T-2 shows the comparative data between the aircraft as shown in FIG. 7 and B-2 aircraft that is the most expensive aircraft today, which is based on tailless flying wing concept.

Also, the military aircraft as shown in FIG. 7 has a very smooth upper and under surface in longitudinal and transversal directions across the entire aircraft span, thus resulting with a smooth airflow around the aircraft including, as well as low interference and compression drag, while B-2 has three marked humps over the upper surface including the central hump with a high curvature that provides for a sufficient height of the inner space for crew and payload accommodation and two somewhat lower humps on both sides laterally from the central hump that are used to form jet engine airintakes. A relatively small distance between the central hump and two lateral humps is resulting with two narrow and deep recesses, thereby generating a significant interference drag, as well as additional compression and wave drag at higher subsonic speeds.

As mentioned earlier, the military aircraft as shown in FIG. 7 has a significantly higher wetted area and friction drag than bomber B-2 despite the shorter span thereof due to a significantly longer length of the airfoil chords in the central section where jet engines are located. Longer chord lengths increase the thickness of the boundary layer and consequently friction drag. However, the thickness of the boundary layer over the upper surface in front of jet engine air intakes of the military aircraft as shown in FIG. 7 is significantly decreased due to

TABLE T-2

Comparison Between FTDMW and A-380 Aircraft

| CATEGORY | B-2 | MILITARY AIRCRAFT - FIG. 7 |
|---|---|---|
| Span [m] | 52.4 | 48.0 (4.4 m shorter - 8.4%) |
| Length Overall [m] | 21 | 45.9 (24.9 m longer - 118.6%) |
| Wing Area [m$^2$] | ~466 | ~746 (280 m$^2$ larger - 60.1%) |
| Tailplane Area [m$^2$] | — | ~144.2 |
| Tailplane Area for Lift Production [m$^2$] | — | 86.5 |
| Total Effective Lift Area [m$^2$] | ~466 | ~832.92 (266.92 m$^2$ larger - 78.7%) |
| All-moving vertical area [m$^2$] | — | 9.5 |
| Total Wetted Area [m$^2$] | ~1165 | ~2138 (973 m$^2$ larger - 83.5%) |
| Airfoil Relative Thickenss [%] | 8-18 | 7-9.5 (1-8.5% lower) |
| Max. Heignt in Payload Area [m] | ~3.5 | ~3.5 (the same) |
| Payload Volume [m$^3$] | ~130 | ~270 (140 m$^3$ larger - 107.7%) |
| T.O. Weight Max. [kg] | 158,760 | ~305,500 (146,740 kg heavier - 92.4%) |
| Operating Weight Empty [kg] | 49,900 | ~91,500 (41,600 kg heavier - 83.4%) |
| Payload Weight Max. [kg] | 22,680 | ~45,000 (22,320 kg heavier - 98.4%) |
| Int. Fuel Capacity Max [kg] | 90,720 | ~180,000 (89,280 kg heavier - 98.4%) |
| Specific Wing Loading (G/A Lift) [kg/m$^2$] | 340.7 | 366.8 (26.1 higher - 7.66%) |

Above comparative data show that the military aircraft as shown in FIG. 7 has practically a twice higher weapon and fuel capacity (98.4%), a slightly shorter wing span (8.4%), and over twice longer overall aircraft length (118.6%) than the tailess flying wing bomber B-2. The total wetted area of the military aircraft as shown in FIG. 7 is larger by 83.5%, the effective airlifting area by 78.7%, and the specific wing load is higher by 7.66% when compared to B-2. A larger wetted area of the military aircraft as shown in FIG. 7 is generating a higher friction drag, while a slightly higher specific wing load is generating a slightly higher profile drag of aircraft. On the other hand, almost twice lower relative thickness of airfoils of the large central area of main wing (22) of the military aircraft as shown in FIG. 7 when compared to B-2 is significantly reducing the profile drag especially at high subsonic speed of over Mach 0.8. Moreover, the application of highly efficient supercritical airfoils outboard of the integral jet engine nacelle (82) across the entire span is providing for additional drastic reduction of profile (compression and wave) drag of the military aircraft as shown in FIG. 7 when compared to tailless flying wing bomber B-2 that is using classical airfoils.

additional energy that is given to the airflow by decompression activity of jet engine compressors, thereby significantly decreasing the friction drag over a very long central section of upper surface of main wing (22).

The energy that jet engine compressors of the military aircraft as shown in FIG. 7 are releasing to accelerate the boundary layer of airflow is decreasing jet engine thrust. However, a much more favorable shape of jet engine airintakes of the military aircraft as shown in FIG. 7, which is close to a circular shape with a significantly higher intake area when compared to B-2 is significantly reducing the turbulent airflow and friction drag inside the airintake when compared to the air intakes of B-2, thus providing for approximately the same jet engine efficiency of both aircraft.

The biggest advantage of the bomber B-2 over the military aircraft as shown in FIG. 7 relates to a significantly higher aspect ratio of up to 60% and consequently a lower induced drag. Therefore, at lower cruising speed (up to Mach 0.6) where induced drag dominates over compression drag, the bomber B-2 would have a higher aerodynamic efficiency and lower fuel consumption. However, at a higher cruising speed (between Mach 0.8 and Mach 0.9) where compression and wave drag dominate over induced drag (especially if airlifting surface is designed by classical airfoils as being the case with B-2 aircraft where the contribution of induced drag in total aircraft drag is under 15%), the military aircraft as shown in FIG. 7 would have a significantly higher aerodynamic efficiency and lower fuel consumption than tailess flying wing B-2. A rough aerodynamic simulation shows that the military aircraft as shown in FIG. 7 at the cruising speed of Mach 0.85 would have more than twice lower fuel consumption per unit of payload when compared to B-2.

In summary, when compared to tailess flying wing bomber B-2, the military aircraft as shown in FIG. 7 when adjusted for bomber application would have the following:

A significantly higher economical cruising speed and consequently a significantly shorter time from take-off to target, which is very important for long-range bombers.

More than 50% longer range with twice higher weaponry load while flying at speeds between Mach 0.8 and Mach 0.9.

A significantly higher level of flight safety under all weather conditions and all flight regimes.

A significantly higher level of maneuverability (especially pitch and yaw) and consequently a higher level of self protection.

A significantly shorter takeoff and landing runway due to ability to deploy very efficient trailing edge flaps and leading edge slabs.

A much simpler system of flight control and airframe shapes, thus resulting with a significantly lower cost production when compared to B-2.

FIGS. 8, 9, and 10 show aircraft that are based on a Canard Deltoid Main Wing (CDMW) aerodynamic configuration. This aerodynamic configuration includes main wing (22), outer wings (42), and outer wing transition sections (52) that constitute the integral airlifting surface of aircraft similarly as being the case with TDMW aerodynamic configuration. The basic conceptual difference is related to the substitution of tailplane (58) with canard (90). This difference is drastically changing the outlook and aerodynamic performance of CDMW aircraft (FIGS. 8, 9, and 10) relatively to TDMW aircraft as shown in FIGS. 1, 2, 3, 4, 5, 6, and 7. Longitudinal diagonal (24) of TDMW aircraft has a highly pronounced aft position relatively to transversal diagonal (26) in order to provide for a higher efficiency of tailplane (58) in pitch control of aircraft, while for the same reason the longitudinal diagonal (24) of the CDMW aircraft has a highly pronounced fore position relatively to transversal diagonal (26) in order to provide for a high efficiency of canard (90) in pitch control of aircraft (FIGS. 8, 9, and 10). A distinctly fore position of longitudinal diagonal (24) is providing for a high sweepback angle of main wing leading edge (34) and a distinctly aft position of lateral tips (36) where outer wings (42) are joined main wing (22), thereby CDMW aerodynamic configuration being applicable for high transonic and supersonic aircraft. Main wing (22) is distinctly longitudinally oriented in order to optimize the aircraft configuration for supersonic speeds, while outer wings (42) of the CDMW aircraft have a short span and a high sweepback angle of outer wings leading edge (44). In the same time, outer wings trailing edge (46) has the sweepback angle close to zero or even a forward sweep angle in order to result with a long airfoil chord of outer wings (42) and provide for a sufficient bending momentum resistance of outer wings (42), which are defined with low relative thickness airfoils that are adjusted for supersonic speed. Outer wings leading edge (44) and wing transition sections leading edge (54) have specific shapes as shown in FIGS. 8, 9, and 10 in order to generate the optimal distribution of wave shocks across the entire aircraft span and minimize the wave drag at supersonic speed, while in the same time providing for a sufficient aerodynamic efficiency of outer wings (42) and wing transition sections (52) at low speed during takeoff and landing of aircraft. The trailing section of outer wings (42) of supersonic aircraft as shown in FIGS. 8, 9, and 10 are having the role of elevons. The symmetrical left and right sections of all-moving pivotal canard (90) are joined main wing (22) in the vicinity of longitudinal diagonal leading tip (28). Canard (90) is fastened to main wing (22) by canard transition section (96), which is used as connecting means between canard (90) and main wing (22). The airframe of canard transition section (96) is fully integrated with the airframe of main wing (22). The airframe of canard transition section (96) is designed to be able to successfully transfer all aerodynamic and inertia forces of canard (90), as well as its own aerodynamic and inertia forces into the airframe of main wing (22). Also, the external shape of canard transition section (96) is smoothly integrated with main wing (22) in order to generate the optimal lift and minimal drag forces in all flights regimes, thus canard transition section (96) is acting as an additional section of the integral airlifting surface of CDMW aircraft. Canard transition section (96) is having canard transition section leading edge (98) and canard transition section leading tip (100). Canard transition section (96) overlaps longitudinal diagonal leading tip (28) of main wing (22) in fore direction, hence canard transition section leading tip (100) is actually the nose of CDMW aircraft. The shape and the longitudinal position of canard transition section leading tip (100) needs to be optimized to form the smallest possible front wave at a supersonic speed. The above requirement consequently results with a high sweepback angle of canard transition section leading edge (98). Canard transition section (96) as a leading forward section of the integral airlifting surface is having a high negative influence on the longitudinal dynamic stability of the CDMW aircraft, thus should have the lowest possible aerodynamic reflection. The lateral sides of canard transition section (96) are flat surfaces that are oriented in airflow direction while being perpendicular to the axis of rotation of canard (90), thus allowing for the unobstructed rotation of canard (90). The upper surface of canard transition section (96) extends in aft direction to the cockpit visor, while the under surface of canard transition section (96) practically substitutes the central portion of main wing under service (40), hence being smoothly streamlined along the entire length of main wing (22). The upper surface of canard transition section (96) in lateral direction is smoothly blended with upper surface of canard (90).

Canard (90) despite a relatively small aerodynamic surface area due to its very long distance from aircraft gravity center represents the main maneuvering surface for pitch control of the CDMW aircraft. The contribution of canard (90) in pitch control of the CDMW aircraft is crucial in all flights regimes especially at transonic and subsonic speeds including takeoff and landing flight regimes. All-moving aerodynamically very efficient canard (90) with a long distance from aircraft gravity center is providing for a very high pitch trim efficiency at the cruising supersonic speed, thus significantly increasing the total efficiency of aircraft when compared to the current supersonic aircraft that have delta wings without canards. Canard (90) provides for a high nose-up momentum around main landing gear during the take-off, thus significantly shortening the length of the take-off runaway. During the airport approach and landing, canard (90) that is set at an angle which results with a high positive lift coefficient provides for a full deployment of trailing edge devices for extra lift production, thus resulting with a low approach and landing aircraft speed at a relatively low attack angle of aircraft, thereby significantly increasing the flight safety when compared to supersonic aircraft without canards. Additionally, a very large airlifting surface area with very long chords of main wing (22) are providing for a very smooth landing due to a significant ground effect. Canard (90) of the military versions of CDMW aircraft during the combat actions at transonic and high-subsonic speeds at low altitudes provides for a high level of aircraft stability and pitch maneuverability, thus significantly increasing the probability of mission success, as well as the survivability of the pilot and the aircraft.

Canard (90) has a simple planform with a high sweepback angle of leading edge (92) and a low sweep angle of trailing edge (94) in order to provide for a low wave drag at supersonic cruising speeds, while simultaneously providing for a sufficient efficiency of canard (90) for pitch control of aircraft at low speeds including takeoff and landing flight regimes. On the other hand, a high sweepback angle of leading edge (92) and a low sweepback angle or forward sweep angle of trailing edge (94) provide for a sufficient bending resistance of the canard airframe despite a relatively thin airfoils of canard (90). Canard leading edge (92) and canard transition section leading edge (98) are blended into a smooth and single forward leading edge whose shape provides for a relatively small wave shocks across the entire span of the forward leading edge. Canard (90) is having a distinct anhedral angle (up to 18°) in order to provide for a sufficient cockpit visibility especially during landing, as well as to provide for an unobstructed airflow over the main upper surface (38) at all speeds, especially during takeoff and landing. On the other hand, the anhedral angle of canard (90) requires the lateral flat surfaces of canard transition section (96) to be deflected towards the aircraft symmetry plane in downward direction, whereby cross section shapes of canard transition section (96) being similar to the cross section shapes of main wing (22) to facilitate a smooth integration of canard transition section (96) with main wing (22) in longitudinal direction. The longitudinal position of axis of rotation of canard (90) along the root airfoil chord of canard (90) should provide for the lowest possible momentum of canard aerodynamic forces around the axis of rotation to minimize the required power for canard rotation in all flights regimes. Canard airfoils should be designed and optimized to generate as low wave drag as possible at supersonic cruising speed, while in the same time the canard airfoils should produce the highest possible positive lift coefficients at low speed and high attack angle when canards are deflected to higher positive angles in order to produce extra lift or generate a high aircraft nose-up pitch momentum. Airfoils of main wing (22) in the central area where payload is disposed should be optimized to generate the lowest possible wave drag, while in the same time providing for required height for payload disposal. All other airfoils of the integral airlifting surface are designed to reach the highest possible aerodynamic efficiency at the supersonic cruising speed. In addition, the upper camber of all airfoils of the integral airlifting surface should have a smoothly curved shape in order to attain a sufficient aerodynamic efficiency of aircraft at high subsonic and transonic speeds and a sufficient lift during takeoff and landing. Fully retractable trailing edge flaps (102) can be mounted on the rear central portion of main wing (22). Retractable trailing edge flaps (102) are gliding on fixed coulisses that can be locked at any extracted position. The upper surface of retractable trailing edge flaps (102) is aerodynamically shaped in such a way that it is smoothly blended with main wing trailing edge (36) in every extracted position. Retractable trailing edge flaps (102) are increasing aircraft lift by increasing the integral airlifting surface area and especially by increasing the upper camber of the large central section of main wing (22). The extracted position of retractable trailing edge flaps (102) can be programmatically optimized for different Mach numbers. The extra lift production during takeoff and landing by the CDMW aircraft is generated by the simultaneous increase of the attack angle of canard (90), a deflection of elevons in downward direction, and by extracting the retractable trailing edge flaps (102) to the outermost extracted position. The pitch maneuver of the CDMW aircraft can be performed by either canard (90) or elevons of outer wings (42) or by a simultaneous action of both canard (90) and elevons. The roll maneuver of the CDMW aircraft is performed only by elevons when they're acting as ailerons. The yaw maneuver and directional control of the CDMW aircraft is performed by fin with rudder that is joined main wing (22) on the rear portion thereof over the main wing upper surface (38) in the symmetry plane near the longitudinal diagonal trailing tip (30). Jet engines of the CDMW aircraft with their nacelles are located under the integral airlifting surface, which is a typical position for large supersonic aircraft. One of the significant challenges related to CDMW aircraft is to find the best design solution for cockpit visor in order to meet two opposite requirements including a good cockpit visibility in all flights regimes and low wave drag in the supersonic cruising regime. The challenge is to create the best shape of the cockpit visor and find the best position of the cockpit along the longitudinal axis of aircraft.

FIG. 9 shows a CDMW aircraft in three views that is aerodynamically optimized for cruising speeds of over Mach 2.5 at the altitude of over 20,000 m. The aerodynamic optimization relates to the general optimization of shape, size, and mutual positions of the main aerodynamic sections including main wing (22), outer wings (42), wing transition sections (52), canard (90), and canard transition sections (96) in order to reach a higher efficiency at target cruising conditions. Also, the shape and position of cockpit visor, the position of jet engine nacelles, as well as the shape, size, and position of fin with rudder are additionally optimized for the aircraft as shown in FIG. 8. The aircraft span is significantly minimized by shortening both the length of transversal diagonal (26) of main wing (22) and the span of outer wings (42). The chord of outer wings (42) is significantly elongated. The span of canard (90) is shortened, while the sweepback angle of leading edge and chord lengths of canard (90) are significantly increased. The width of canard transition section (96) is significantly shortened, while the sweepback angle of canard transition section leading edge (98) is increased. The cockpit visor of the aircraft as shown in FIG. 9 is significantly shifted in fore direction toward the longitudinal diagonal leading tip (28) where the width of main wing (22) is much shorter, hence main wing leading edge (34) is very close to lateral cockpit windows, thus providing for an unobstructed lateral view in downward direction aft of canard (90), thereby significantly increasing the aircraft safety during landing when compared to aircraft as shown in FIG. 8. Also, canard transition section nose (100) is additionally shifted in downward direction relatively to cockpit visor, thus increasing the angle of the frontal view when compared to aircraft as shown in FIG. 8. The shift of canard transition section nose (100) in downward direction is additionally significantly increasing the height of canard transition section (96) and the front portion of main wing (22) behind canard (90), thus providing for the increase of bending resistance of the airframe of canard transition section (90) and main wing (22) in the vicinity of canard joint, while simultaneously providing for increased internal cockpit height. The central front reinforcement of cockpit visor, which is raising up from the upper surface of canard transition section (96) has a higher sweepback angle and a sharp front edge in order to minimize the wave shocks that are generated around the cockpit visor. The bottom section of the front cockpit airframe is fully integrated with the airframe of canard transition section (96) in order to additionally increase the bending resistance of the front aircraft section to enable a successful transfer of all forces of canard (90) and canard transition section (96) into the airframe of main wing (22).

Aerodynamically optimized aircraft shape as shown in FIG. 9 can be used to develop a realistic aircraft project for different civil and military applications by introducing additional smaller aerodynamic shape optimizations depending on particular application. The civil aircraft require a higher level of longitudinal dynamic stability with positive static margin, a higher level of flight safety at low speeds, and low fuel consumption per unit of payload. Furthermore, a higher level of longitudinal dynamic stability requires the shift of outer wings (42) in aft direction. A higher level of flight safety at low speeds requires the increase of aircraft span, while low fuel consumption requires low wing loading in order to reach the economical cruising speed at the highest possible altitude where the air density and wave drag are lower. The optimized aircraft version for a civil passenger application is shown in FIG. 9.

Military aircraft generally require a lower visual and radar visibility, a higher level of aircraft maneuverability, and the longest possible combat radius or flight autonomy. Furthermore, the lower level of aircraft visual reflection requires smaller aircraft dimensions. A higher level of aircraft maneuverability requires the shift of outer wings (42) in fore direction and a decrease of aircraft span. All of these specific adjustments that are depending on the specific aircraft application will not significantly change the overall layout of aircraft as shown in FIG. 9.

Generally, supersonic aircraft including the supersonic aircraft based on deltoid main wing aerodynamic configuration cannot be competitive with deltoid main wing high-subsonic and transonic aircraft for mass civil air transportation due to a higher fuel consumption per unit of payload of supersonic aircraft. However, there is a potential market for business supersonic long-range continental and intercontinental aircraft with routes between large world business centers. The cruising speed would be adjustable and ranging between Mach 2 and 3. A CDMW aircraft as shown in FIG. 9 that is optimized for civil applications that is scaled in size for the capacity between 120 and 150 passengers would have dimensions and performance as shown in table T-3 below. The same table shows comparative data with "Concorde" aircraft, which is the only passenger supersonic aircraft that has been commercially produced so far.

TABLE T-3

Comparison Between CDMW and Concorde Aircraft

| CATEGORY | CONCORDE | CDMW - FIG. 9 |
|---|---|---|
| Wing Span [m] | 25.6 | 29.4 (14.8% larger) |
| Length Overall [m] | 61.66 | 48.45 (21.42% shorter) |
| Height Overall [m] | 12.2 | 7.8 (36% lower) |
| Wing Area [m$^2$] | 358.25 | 576 (60.8% larger) |
| Canard Area [m$^2$] | — | 18.5 |
| Retractible Trailing Edge Flaps Area [m$^2$] | — | 7.92 |
| Effective Airlifting Surface Area at Supersonic Cruising Speed [m$^2$] | 358.25 | 594.5 (66% larger) |
| Effective Airlifting Surface Area During Takeoff and Landing [m$^2$] | 358.25 | 602.42 (68.2% larger) |
| Fin With Rudder Area [m$^2$] | ~44 | 34 (22.7% smaller) |
| Fuselage Surface Area [m$^2$] | ~1,030 | — |
| Total Aircraft Wetted Area [m$^2$] | ~1,950 | ~1,600 (18% smaller) |
| Passenger Capacity - two class arrangement (no. of passengers) | 100 | 120 (20% higher) |
| Passenger Capacity Max. (no. of passengers) | 128 | 144 (12.5% higher) |
| Operating Weight Empty [kg] | 78,800 | ~55,000 (30% lower) |
| Payload Weight Max. [kg] | 13,380 | 15,000 (12% heavier) |
| Fuel Weight Max. [kg] | 95,680 | 120,000 (25.4% heavier) |
| Takeoff Weight Max. [kg] | 185,880 | 190,000 (2.2% heavier) |
| Landing Weight - 20% Fuel [kg] | 111,316 | 94,000 (15.6% lighter) |
| Airlifting Loading During Takeoff [kg/m$^2$] | 521.6 | 315.4 (39.5% lower) |
| Airlifting Loading During Landing [kg/m$^2$] | 310.7 | 156 (49.8% lower) |
| Cruising Speed at Max. Altitude | Mach 2.04 at 18,288 m | ~Mach 2.8 (37.25% faster) at 26,000 m (42% higher) |
| Max. Range [km] | 7,200 | ~12,500 (73.6% longer) |

The estimated value of operating weight empty of the CDMW aircraft as shown in FIG. 9, which is 30% lower when compared to Concorde aircraft is based on the fact that the CDMW aircraft has 18% smaller wetted area, while almost 100% of the airframe is made of advanced composite materials (stronger and more than twice lighter than aluminum), whereas the mutual distribution of aerodynamic and inertia forces is much more favorable when compared to Concorde aircraft. The estimated 37% higher cruising speed at 42% higher altitude of the CDMW supersonic passenger aircraft as shown in FIG. 9 when compared to Concorde supersonic passenger aircraft is based on the facts that the supersonic passenger aircraft as shown in FIG. 9 has 66% larger airlifting surface area, 39.5% lower specific wing loading, and 18% smaller total wetted area. The lower specific wing loading and larger airlifting surface area of the CDMW aircraft enables the horizontal flight in the cruising speed configuration at a significantly higher altitude when compared to Concorde. In return, a significantly higher altitude where the air density is significantly lower combined with additional 18% smaller total wetted area provide for an increase in the cruising speed of the CDMW aircraft with the same engine thrust as the one of the Concorde supersonic aircraft. Furthermore, the increased cruising speed of the CDMW aircraft is providing for an additional increase in altitude where the air density is lower, hence resulting with lower drag. This positive feed of ever increasing altitudes and speeds are supporting each other and providing for the increase in speed of 37% and altitude of 42% of the CDMW aircraft as shown in FIG. 9 when compared to Concorde aircraft with the same engine thrust.

The higher economical cruising speed of 37%, as well as the higher payload capacity of 12% of the CDMW aircraft when compared to Concorde with the same power plant is resulting with the lower fuel consumption of 55% per unit of payload of CDMW aircraft. Also, the 37% higher economical cruising speed and 25.4% higher fuel capacity of CDMW aircraft are resulting with 73% longer range when compared to Concorde. Additionally, the aerodynamically very efficient pivotal canard (90) with a very long arm from the aircraft gravity center is significantly increasing the pitch trim efficiency at supersonic cruising speeds when compared to Concorde, thus additionally reducing the fuel consumption and increasing the range of CDMW aircraft.

Canard (90) is decreasing the natural longitudinal stability of CDMW aircraft. However, canard (90) is a very efficient pivotal pitch maneuvering surface with a very long arm from the gravity center, hence significantly increasing fly-by-wire longitudinal static stability of the CDMW aircraft as shown in FIG. 9. In addition, canard (90) as a pivotal airlifting surface when being set at a positive attack angle is generating a high positive pitch momentum due to a very long distance of canard (90) from the aircraft gravity center. Such high positive pitch momentum allows for a full deployment of trailing edge devices for extra lift production (elevons and retractable trailing edge flaps), thereby providing for a high lift coefficient of the integral airlifting surface of the CDMW aircraft as shown in FIG. 9 at low speeds during takeoff and landing. A high lift coefficient of the integral airlifting surface that is generated by trailing edge devices for extra lift production and a very low airlifting loading of the CDMW aircraft during landing (only 156 kg/m$^2$, which is 50% less when compared to Concorde) is resulting with a low speed at low attack angles during airport approach and landing, thereby providing for a significantly higher level of safety, as well as a significantly shorter takeoff and landing runway when compared to Concorde. Also, a simultaneous deflection of Canard (90) and elevons (up or down) generates a significantly higher pitch momentum and consequently a higher level of pitch control and pitch maneuverability when compared to Concorde, thereby additionally significantly increasing the flight safety of CDMW aircraft at low speed.

The CDMW aerodynamic configuration is geared more towards military applications especially for a supersonic strategic high-weapons-capacity bomber. Table T-4 below shows comparative data between the supersonic strategic bomber B-1 and the supersonic CDMW bomber as shown in FIG. 10, which carries 30,000-40,000 kg of weaponry.

TABLE T-4

Comparison Between CDMW and B1-B Aircraft

| CATEGORY | B-1B | CDMW - FIG. 10 |
|---|---|---|
| Wing Span (fully spread) [m] | 41.67 | 26.24 (37% shorter) |
| Wing Span (fully swept) [m] | 23.84 | 22.75 (4.6% shorter) |
| Length Overall [m] | 44.81 | 46.56 (3.91% longer) |
| Height Overall [m] | 10.36 | 5.25 (49.3% lower) |
| Wing Area [m$^2$] | 181.2 | 472.35 (160.7% larger) |
| Tailplane Area [m$^2$] | 43 | — |
| Canard Area [m$^2$] | — | 12.2 |
| Retractible Trailing Edge Flaps Area [m$^2$] | — | 10.75 |
| Fin With Rudder Area [m$^2$] | ~23 | ~23.6 (the same) |
| Effective Airlifting Surface Area at High Speed [m$^2$] | 181.2 | 367.8 (103% larger) |
| Effective Airlifting Surface Area at Low Speed [m$^2$] | 181.2 | 378.55 (108.9% larger) |
| Fuselage Surface Area [m$^2$] | ~420 | — |
| Total Wetted Area [m$^2$] | ~950 | ~1020 (7.4% larger) |
| Operating Weight Empty [kg] | 87,090 | ~45,000 (48.3% lighter) |
| Weapons Load, Max. [kg] | 34,019 | 35,000 (2.9% heavier) |
| Fuel Weight Max. [kg] | 88,450 | 90,000 (1.8% heavier) |
| Takeoff Weight Max. [kg] | 216,365 | 206,000 (4.79% lighter) |

TABLE T-4-continued

Comparison Between CDMW and B1-B Aircraft

| CATEGORY | B-1B | CDMW - FIG. 10 |
|---|---|---|
| Airlifting Loading, Max. [kg/m$^2$] | 1,194 | 436.1 (63.5% lower) |
| Max. Level Speed | Mach 1.2 | ~Mach 2.5 (108% faster) |
| Cruising Speed | Mach 0.9 at 13,500 m | ~Mach 2.4 (167% faster) at 21,000 m (56% higher) |
| Low level Penetration Speed [km/h] | 965 | 1090 (12.95% higher) |
| Unrefueled Range, Max [km] | 12,000 | ~8,500 (29.17% shorter) |

The estimated value of 45,000 kg of operating weight empty of the supersonic CDMW bomber as shown in FIG. 10 is based on the comparison of its total wetted area and the total wetted area of the subsonic flying wing bomber B-2 although the airframe of such aircraft has a much more robust shape and a more favorable load distribution.

The estimated Mach 2.4 cruising speed and 21,000 m cruising altitude, as well as 8,500 km range without refueling of the supersonic CDMW bomber as shown in FIG. 10 are based on the comparison with Concord that is much more similar to the bomber as shown in FIG. 10 than the bomber B1-B, which is actually a transonic aircraft. The supersonic bomber as shown in FIG. 10 has 16.39% smaller airlifting loading and 47% smaller total wetted area when compared to the Concord aircraft. The lower airlifting loading is directly allowing for the flight at higher cruising altitudes, while indirectly resulting with a higher cruising speed with the same engine thrust due to a lower air density at higher altitudes, whereas the lower total wetted area is directly providing for a higher cruising speed due to lower friction drag, thus indirectly allowing for the flight at a higher cruising speed. Both of these effects combined together are providing for a cruising speed increase of approximately 17% and the increase in cruising altitude of 15% of the CDMW supersonic bomber relatively to the Concord aircraft with the same power plant. Such increase in cruising speed with the same power plant would result with an increase of the supersonic bomber range to approximately 8,500 km. When compared to the existing strategic bomber B-1B, which is rather a transonic than a supersonic aircraft that has a cruising speed of Mach 0.9, the supersonic strategic bomber as shown in FIG. 10 is having approximately the same weapons capacity (2.9% higher), a cruising speed higher by more than 2.6 times at higher cruising altitude of over 56%, higher low-level penetration speed of about 13% for special combat missions, a lower radar visibility due to smaller external dimensions, and a more favorable external shape including materials with lower radar reflection, and a shorter range (combat radius) by about 30%. Multiply higher cruising speed of the supersonic bomber as shown in FIG. 10 is providing for multiply shorter time to reach the combat target, while together with a significantly higher cruising altitude, a lower radar visibility, and a higher low-level penetration combat speed is providing for a significantly higher level of aircraft survivability during combat missions. The shorter range of the supersonic bomber as shown in FIG. 10 is the result of a significantly higher drag at supersonic speed despite a significantly higher cruising altitude.

However, the supersonic bomber as shown in FIG. 10 is showing a different picture when compared with the Russian Tupolev supersonic bomber "Black Jack". The CDMW bomber as shown in FIG. 10 would have a significantly higher weapons capacity (over 114%) with significantly smaller external dimensions (33% shorter span and 25% shorter length), which is drastically decreasing radar visibility, while having a higher maximum speed by 8.7%, as well as a longer range of over 16%.

Although the supersonic CDMW aircraft as shown in FIG. 10 has a longer range than the existing supersonic bombers, the range of 8,500 km is inadequate relative to requirements for a strategic supersonic bomber. The most efficient way to increase the range of supersonic CDMW bomber is to increase the airlifting area thereof in order to provide for an adequate increase in fuel capacity. A rough aerodynamic simulation shows that a 33% increase of the airlifting surface area, as well as a 41% increase in fuel capacity of the supersonic CDMW bomber as shown in FIG. 10 would result with the increase of aircraft range up to 12,000 km. In that case, the supersonic CDMW bomber would still have a 22% shorter span and 14% shorter overall length and 64% longer range when compared to the Russian strategic supersonic bomber "Blackjack".

We claim:

1. A T-tailed deltoid main wing aircraft having a vertical symmetry plane oriented in airflow direction, said T-tailed deltoid main wing aircraft comprising:
   a. means for aerodynamic lift production, said means for aerodynamic lift production being symmetrical relative to said symmetry plane, said means for aerodynamic lift production including a main wing, two symmetrical outer wings, and two symmetrical wing transition sections, said main wing being the central section of said means for aerodynamic lift production, the main wing trailing edge being defined by two straight lines, said two straight lines being symmetrical relative to said symmetry plane, the intersection of said two straight lines being a trailing tip of said main wing, said main wing trailing edge being substantially forward swept, thus said trailing tip being substantially shifted in aft direction behind the mean geometric chord of said means for aerodynamic lift production, said means for aerodynamic lift production being defined by efficient aft camber airfoils across the span thereof,
   b. a plurality of jet engines with jet engine support means and jet engine aerodynamic covers, each jet engine aerodynamic cover including a jet engine air intake, said jet engine support means being joined to said means for aerodynamic lift production, the top of said jet engine support means being above said means for aerodynamic lift production, said jet engines with said jet engine aerodynamic covers being joined to said jet engine support means on the top thereof, thus said jet engine air intake being subjected to free unobstructed airflow over the turbulent boundary layer of said means for aerodynamic lift production, said jet engine support means together with said jet engine aerodynamic covers being shaped as integral vertical aerodynamic surfaces, said integral vertical aerodynamic surfaces are positioned laterally from the rear portion of said main wing on both sides thereof, thus being the means for reduction of vortex activity around said rear portion,
   c. means for aerodynamic stabilization, said means for aerodynamic stabilization being symmetrical relative to said symmetry plane, said means for aerodynamic stabilization including a fin and a tailplane, said fin being joined directly to the upper side of said rear portion of said main wing, said fin being substantially extended in aft direction relative to said trailing tip, said fin having a sweepback angle, said tailplane being joined to said fin, said tailplane having an outermost aft position relative to said fin, the airframe of the root section of said fin forward of said trailing tip being integrated with the airframe of said rear portion as the upper reinforcement thereof, thus substantially increasing the bending resistance of said rear portion, hence said rear portion and said upper reinforcement with the unchanged weight thereof allowing for an additional substantial shift of said root section of said fin in aft direction relative to said trailing tip, as well as a substantially higher sweepback angle of said fin, whereby the substantially shifted said trailing tip in aft direction relative to said mean geometric chord of said means for aerodynamic lift production, said additional substantial shift of said root section relative to said trailing tip, said substantially higher sweepback angle of said fin, and said outermost aft position of said tailplane altogether providing for a substantial shift of the neutral point of said T-tailed deltoid main wing aircraft in aft direction along said mean geometric chord, said substantial shift of said neutral point allowing for a substantial shift of the gravity center with a positive static margin of said T-tailed deltoid main wing aircraft in aft direction along said mean geometric chord, said positive static margin satisfying the level of natural longitudinal dynamic stability of said T-tailed deltoid main wing aircraft that is required for commercial aircraft, said substantial shift of said gravity center in aft direction along said mean geometric chord of said means for aerodynamic lift production that are defined by said efficient aft camber airfoils providing for the longitudinal static stability of said T-tailed deltoid main wing aircraft in the cruising configuration thereof, said efficient aft camber airfoils across the span of said means for aerodynamic lift production providing for a substantially higher aerodynamic efficiency and lower fuel consumption per unit of payload of said T-tailed deltoid main wing aircraft at high subsonic and transonic speed when compared to prior art tailless and tailed flying wing aircraft.

* * * * *